US012798934B2

(12) United States Patent
Pugh et al.

(10) Patent No.: US 12,798,934 B2
(45) Date of Patent: Nov. 17, 2026

(54) BATTERY OPERATED LIFT JACK FOR RAILWAYS

(71) Applicant: FTS Tools, LLC, Ledgewood, NJ (US)

(72) Inventors: Kevin Pugh, Lynchburg, VA (US); Landin Robinson, Lynchburg, VA (US); Charlie Preston, Lynchburg, VA (US); Peter J. Bartek, Lynchburg, VA (US)

(73) Assignee: FTS Tools, LLC, Ledgewood, NJ (US)

(*) Notice: Subject to any disclaimer, the term of this patent is extended or adjusted under 35 U.S.C. 154(b) by 0 days.

(21) Appl. No.: 19/337,120

(22) Filed: Sep. 23, 2025

(65) Prior Publication Data

US 2026/0084943 A1 Mar. 26, 2026

Related U.S. Application Data

(60) Provisional application No. 63/697,923, filed on Sep. 23, 2024.

(51) Int. Cl.
*B66F 3/08* (2006.01)

(52) U.S. Cl.
CPC ............ *B66F 3/08* (2013.01); *B66F 2700/04* (2013.01)

(58) Field of Classification Search
CPC ........... B66F 3/08; B66F 3/10; B66F 2700/04
USPC ............ 254/98
See application file for complete search history.

(56) References Cited

U.S. PATENT DOCUMENTS

| | | | | |
|---|---|---|---|---|
| 610,044 A | | 8/1898 | Glenn | |
| 2,043,479 A | * | 6/1936 | Greiman | B66F 3/08 254/100 |
| 2,506,634 A | * | 5/1950 | Fields | B66F 3/08 254/98 |
| 6,053,477 A | * | 4/2000 | Price | B66F 3/005 254/94 |

(Continued)

FOREIGN PATENT DOCUMENTS

| | | |
|---|---|---|
| CN | 107938442 A | 4/2018 |
| JP | 5980743 B2 | 8/2016 |
| JP | 2021075913 A | 5/2021 |

OTHER PUBLICATIONS

International Search Report and Written Opinion of the International Searching Authority in relation to International Application No. PCT/US2025/047520 dated Jan. 28, 2026, 16 pages.

*Primary Examiner* — Seahee Hong
(74) *Attorney, Agent, or Firm* — Bochner PLLP; Matthew J May

(57) ABSTRACT

A dual-use, battery-operated rail lifting device for railway maintenance is disclosed. The device includes a two-piece housing assembly and an internal lift mechanism actuated by a battery-powered electric drive unit coupled to a screw threaded rod. A lifting L-shaped structure extends vertically from ground level to raise and stabilize a running rail segment without manual lifting or hydraulic systems. The rail lifting device may be ergonomically configured for waist-level operation, reducing torsional stress and back injury risk, while increasing stability, load capacity, and durability. The design may be adaptable to various rail sizes, lightweight, and operable with either an integrated motor or a detachable off-the-shelf impact drill, thereby simplifying field operation in remote railway environments.

12 Claims, 23 Drawing Sheets

(56) References Cited

U.S. PATENT DOCUMENTS

| | | | | |
|---|---|---|---|---|
| 2010/0108967 | A1* | 5/2010 | Endo | B66F 3/25 137/556 |
| 2013/0206435 | A1* | 8/2013 | Papp | B25B 21/00 173/20 |
| 2015/0197127 | A1* | 7/2015 | Magestro | B66F 3/08 173/217 |
| 2016/0229244 | A1* | 8/2016 | Drake | B66F 3/08 |
| 2022/0090331 | A1 | 3/2022 | Benjamin et al. | |

* cited by examiner

SECTION A-A

DETAIL E

SECTION E-E

SECTION A-A

BATTERY OPERATED LIFT JACK FOR RAILWAYS

CROSS-REFERENCE TO RELATED APPLICATIONS

This application claims priority to U.S. Provisional Application No. 63/697,923, filed Sep. 23, 2024 which is herein incorporated by reference in its entirety.

FIELD OF INVENTION

The present invention relates generally to railway maintenance equipment, and more particularly, to a dual-use, battery-operated rail lifting device designed for ergonomically elevating and stabilizing railway running rails.

BACKGROUND

Maintenance of railway track infrastructure often requires lifting and stabilizing running rails for inspection, replacement, or repair. Conventional rail lifting devices typically rely on mechanical ratchet jacks, hydraulic jacks, or manual lifting, which can be heavy, complex, and ergonomically hazardous. These systems often operate at ground level, requiring operators to bend or exert significant torsional force, thereby increasing the risk of musculoskeletal strain and back injury.

Additionally, traditional lifting equipment may lack adaptability to different rail sizes, may be cumbersome to transport in remote railway environments, and can involve time-consuming setup or specialized power sources. Existing designs also tend to prioritize spike extraction rather than rail elevation, limiting their effectiveness when precise rail stabilization is required.

Accordingly, there remains a need for a lightweight, portable, and ergonomic rail lifting device that can be operated at waist level, minimize operator strain, adapt to multiple rail sizes, and eliminate reliance on hydraulic or ratchet-based systems. The present invention addresses these needs by providing a dual-use, battery-powered rail lifting device that incorporates a screw-driven lift mechanism actuated by either an integrated motor or a detachable impact drill, thereby delivering enhanced safety, efficiency, and adaptability in railway maintenance operations.

BRIEF SUMMARY

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

The present invention provides a rail lifting device that may include an electric drive unit assembly connected to a lift jack assembly for lifting and stabilizing a railway running rail, wherein the lift jack assembly may comprise a housing assembly and a vertical displacement jack assembly that fits within the housing assembly.

In some examples, the rail lifting device may include a housing assembly, a vertical displacement jack assembly disposed within the housing assembly, a lift tube assembly coupled to a screw shaft assembly, and an electric drive unit assembly operatively coupled to the screw shaft assembly. The housing assembly may include an upper housing and a lower housing joined together to define an internal cavity. The lower housing may include a foot plate configured to rest on the ground and initiate lifting from ground level. The vertical displacement jack assembly may include the screw shaft assembly with a threaded drive shaft. The lift tube assembly may include a lift toe configured to slide beneath the running rail at ground level and extend vertically to elevate and stabilize a rail segment to a predetermined height.

In some examples, the electric drive unit assembly may comprise a detachable, off-the-shelf battery-operated impact drill. In another example, the electric drive unit assembly may comprise an integrated electric motor and gearbox powered by a rechargeable battery system. The rail lifting device may be configured for waist-level operation to minimize torsional moment on an operator and reduce a risk of back injury, and wherein the device operates without hydraulic or ratchet systems. The housing assembly may comprise a lower housing including buttress plates between the housing and the foot plate for structural reinforcement. The housing assembly may comprise an impact plate offset on a rear side of the housing for driving the foot plate beneath the rail. The upper housing may include a handle attached to a sidewall for ergonomic maneuvering. The screw shaft assembly may include a drive shaft having an Acme threaded region, a smooth region, and a reduced diameter region, the drive shaft coupled to the lift tube assembly via a mounting flange. The vertical displacement jack assembly may further include a bearing block mounted within the upper housing, the bearing block containing one or more roller bearings to support free rotation of the drive shaft. The one or more roller bearings may include an upper tapered roller bearing and a lower tapered roller bearing. The lift tube assembly may comprise an upper torque tube, a lower torque tube, and the lift toe welded to the lower torque tube. The upper torque tube and the lower torque tube may be guided and fit within the housing by an upper tube guide block and a lower tube guide block. The device of claim 1, further comprising grease fittings located on the housing assembly to provide lubrication to the screw shaft assembly. The rail lifting device may further comprise an anti-vibration handle and a reinforced shaft configured to withstand repeated railway impacts. The housing assembly may include measurement markings on the lower housing to indicate range of vertical displacement of the lift toe. The electric drive unit assembly may include a drill face plate, handle plate, and quick-connect fastening straps configured to secure and detach the electric drive unit assembly.

In some examples, a method for lifting and stabilizing a railway running rail segment may comprising: positioning a rail lifting device such that the lift toe is located beneath the rail at ground level; activating the electric drive unit assembly to rotationally drive the threaded shaft, thereby vertically displacing the lift tube assembly and elevating the rail segment by up to approximately seven inches; and stabilizing the device at waist level using ergonomic handles to reduce torsional moment and operator strain.

In some examples, a battery-operated rail lifting device for railway maintenance may comprise: a two-piece housing assembly, an internal component assembly disposed within the housing assembly, a battery-powered electric drive unit, a lifting L-shaped structure configured to lift and stabilize a railway running rail segment, and a base platform integrated with the housing assembly. The two-piece housing assembly may include a lower housing weldment and an upper housing weldment joined by a plurality of screws, wherein the two-piece housing assembly defines an internal cavity with an opening through at least one side thereof. The internal component assembly may be disposed within the internal cavity. The internal component assembly may include a screw threaded rod rotatably coupled to a battery-powered electric drive unit via one or more fasteners. The battery-powered electric drive unit may be configured to rotationally drive the screw threaded rod and may comprise a brushless motor and rechargeable battery system. The lifting L-shaped structure may be coupled to the screw threaded rod and may be configured to extend and retract vertically within a range of approximately seven inches from a ground-zero starting position to elevate and stabilize a railway running rail segment to a predetermined height without manual bending or lifting. The base platform may be integrated with the lower housing weldment. The base platform may include a handle-incorporated foot plate slightly larger than an inserted lift tube for flush seating and ergonomic maneuvering, an impact plate for load distribution, and an anti-vibration handle to reduce hand-arm vibration. The rail lifting device may be lightweight, adaptable to various railway rail sizes, and operates without hydraulic or ratchet systems.

These and various other features will be described more fully herein.

BRIEF DESCRIPTION OF THE DRAWINGS

The present invention is illustrated by way of example and not limited in the accompanying figures in which reference numerals indicate similar elements and in which.

Figure 1A:
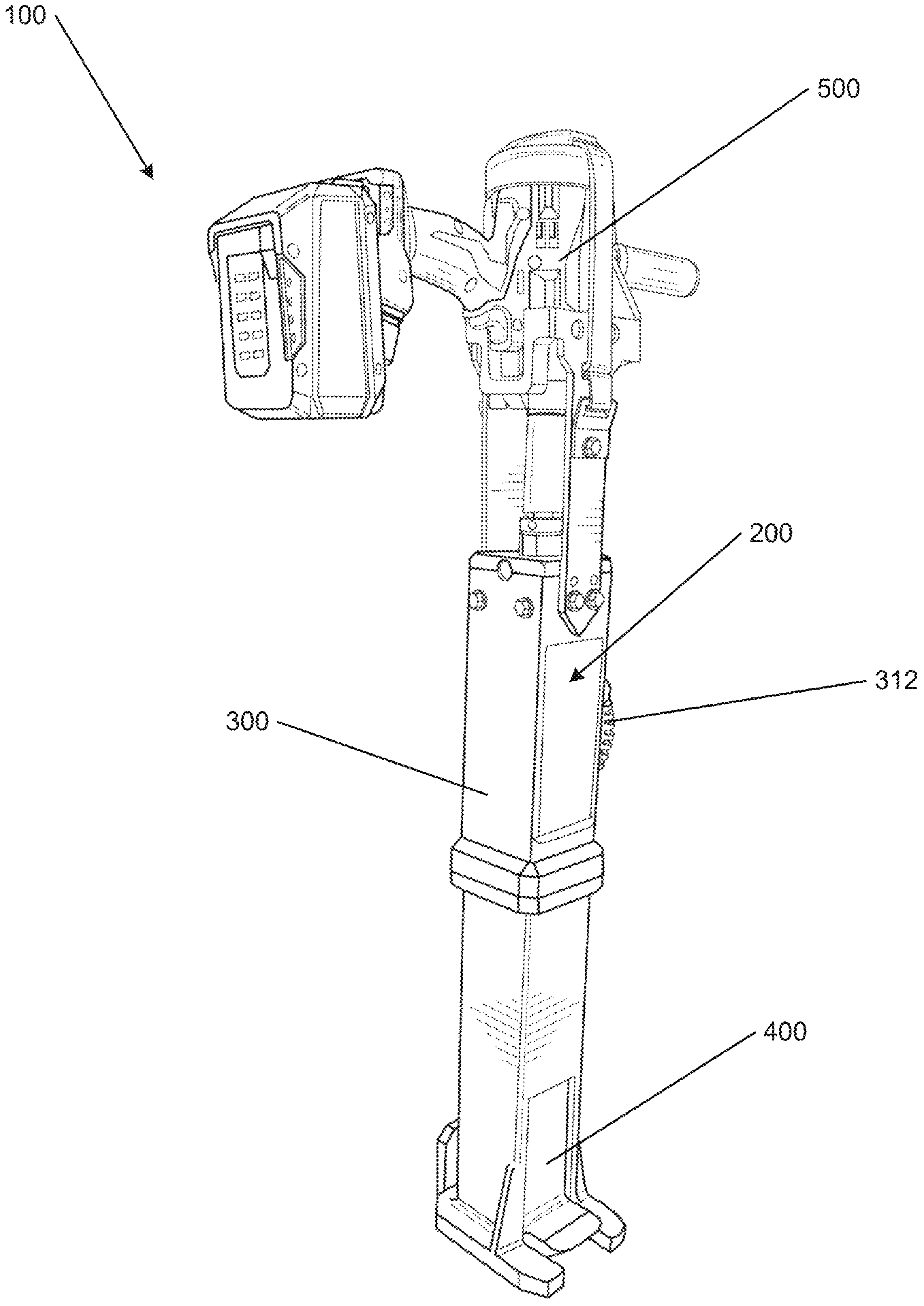
FIG. 1A depicts a front perspective view of the rail lifting device with a vertical displacement jack assembly in a lowered configuration, according to one or more aspects described herein.
Figure 1B:
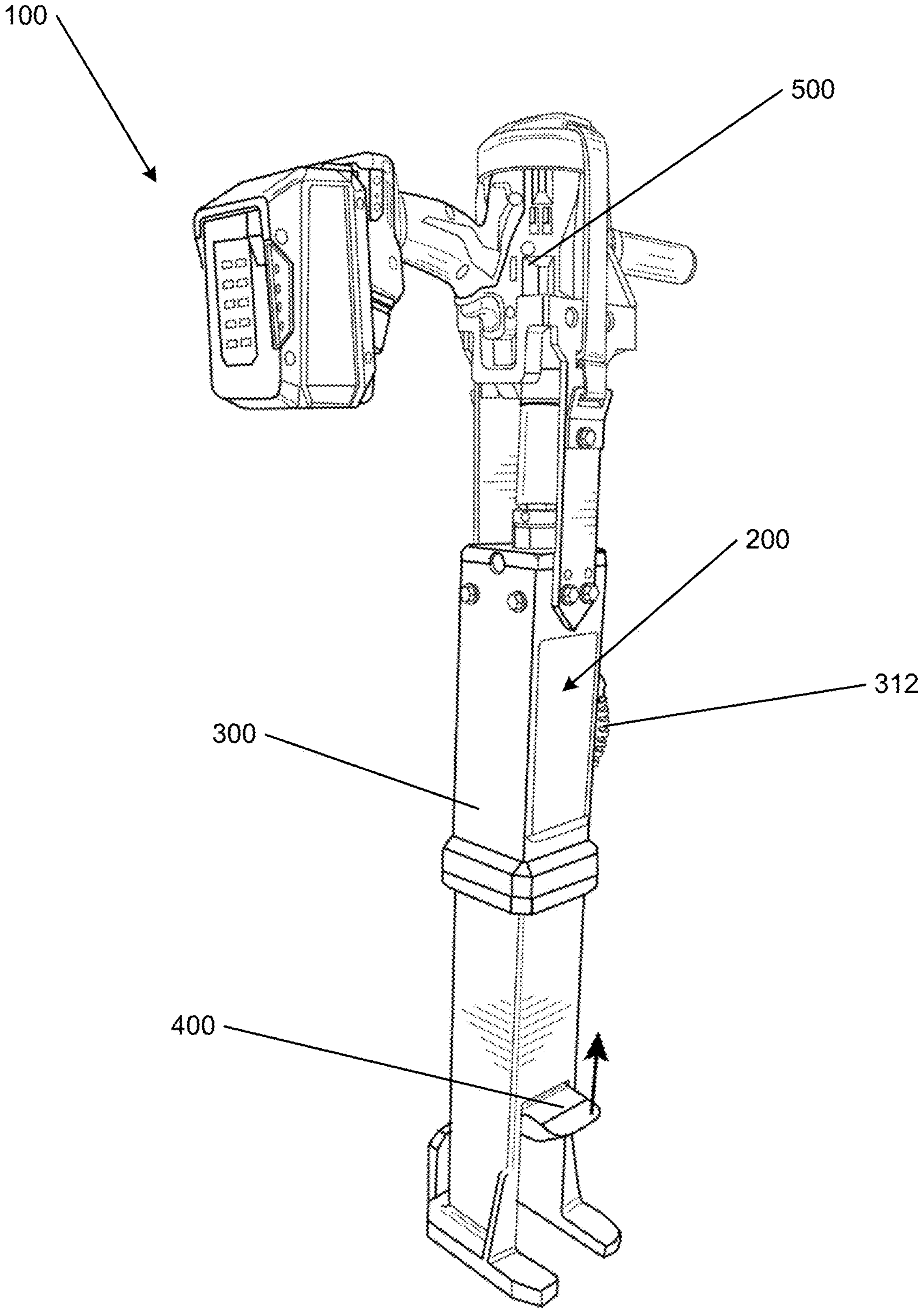
FIG. 1B depicts a front perspective view of the rail lifting device from FIG. 1A with the vertical displacement jack assembly in a raised configuration, according to one or more aspects described herein.

Further, it is to be understood that the drawings may represent the scale of different components of one single embodiment; however, the disclosed embodiments are not limited to that particular scale.

DETAILED DESCRIPTION

A dual-use, battery-operated rail lifting device for railway maintenance is disclosed. The device includes a two-piece housing assembly and an internal lift mechanism actuated by a battery-powered electric drive unit coupled to a screw threaded rod. A lifting L-shaped structure extends vertically from ground level to raise and stabilize a running rail segment without manual lifting or hydraulic systems. The rail lifting device may be ergonomically configured for waist-level operation, reducing torsional stress and back injury risk, while increasing stability, load capacity, and durability. The design may be adaptable to various rail sizes, lightweight, and operable with either an integrated motor or a detachable off-the-shelf impact drill, thereby simplifying field operation in remote railway environments.

In the following description of various example structures according to the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention. Also, while the terms "top," "bottom," "front," "back," "side," "rear," and the like may be used in this specification to describe various example features and elements of the invention, these terms are used herein as a matter of convenience, e.g., based on the example orientations shown in the figures or the orientation during typical use. Nothing in this specification should be construed as requiring a specific three-dimensional orientation of structures in order to fall within the scope of this invention. Also, the reader is advised that the attached drawings are not necessarily drawn to scale.

In the following description of the various embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made without departing from the scope and spirit of the present disclosure.

In general, as described above, aspects of this invention relate to an apparatus or a rail lifting device to lift a running rail on a railway comprising an electric drive unit assembly connected to a lift jack assembly, wherein the lift jack assembly may comprise a housing assembly and a vertical displacement jack assembly. More detailed descriptions of aspects of this invention follow.

A dual use battery-operated rail lifting device may be designed for ergonomic lifting and stabilizing rail segments, utilizing a standard off-the-shelf impact drill. This rail lifting device may feature a housing assembly, and a lift tube assembly, with an integrated special internal unique lifting mechanism that starts at ground zero and lifts the rail to the perfect height. As part of the design is a torque tube and an internal threaded rod powered by the drill, which replaces traditional mechanical, ratchet style and hydraulic systems. By employing this setup, the rail lifting device significantly reduces the risk of back injury because the rail lifting device is at waist level, lowering the torsion moment during lifting tasks, thus enhancing stability, increasing load capacity, and durability. This ergonomic approach not only improves user safety but also simplifies the lifting process in various applications when lifting the running rail.

The present invention introduces a versatile and highly efficient dual-use battery-operated rail lifting device tailored for the railway industry. This rail lifting device may be purpose-built for the precise stabilization of rail segments and effective in lifting the railway running rail. The dual-use design accommodates any rail size offering flexibility and adaptability to the needs of rail maintenance personnel.

Figure 7A:
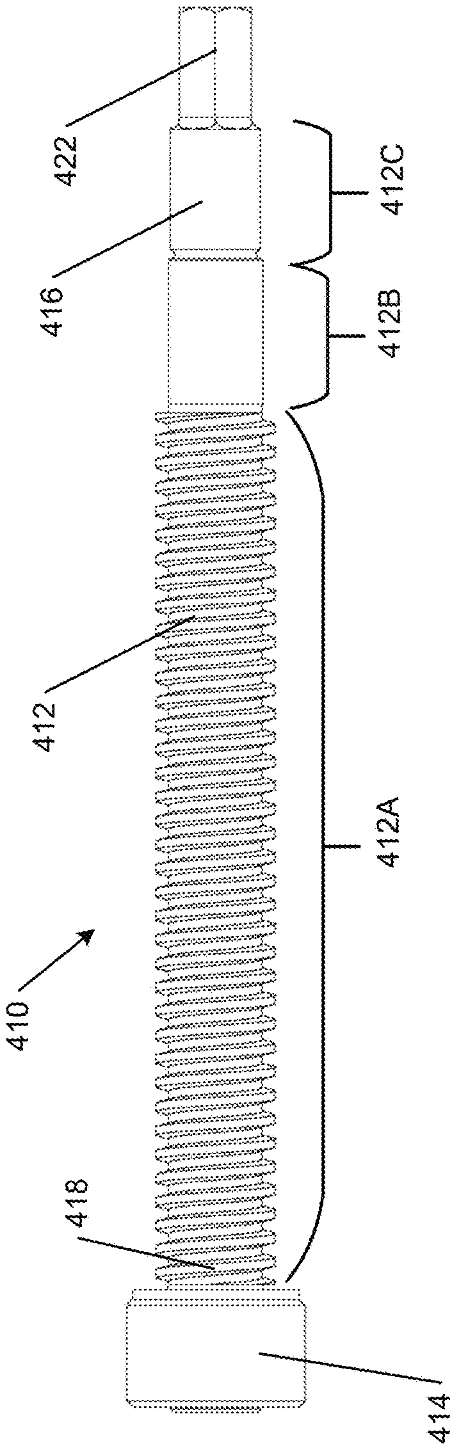
FIG. 7A depicts a side view of a screw shaft assembly of the vertical displacement jack assembly from FIG. 1A, according to one or more aspects described herein.
Figure 7C:
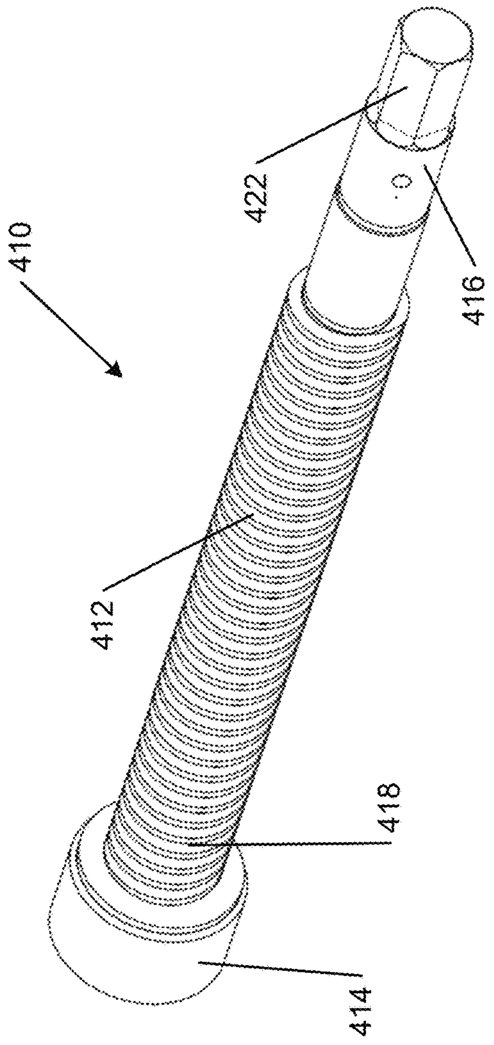
FIG. 7C depicts a side perspective view of the screw shaft assembly from FIG. 7A, according to one or more aspects described herein.
Figure 7B:
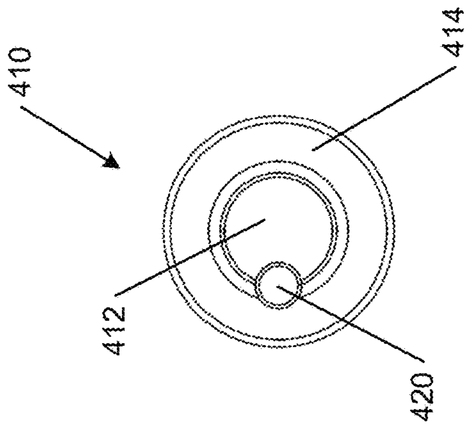
FIG. 7B depicts a top view of the screw shaft assembly from FIG. 7A, according to one or more aspects described herein.
Figure 8A:
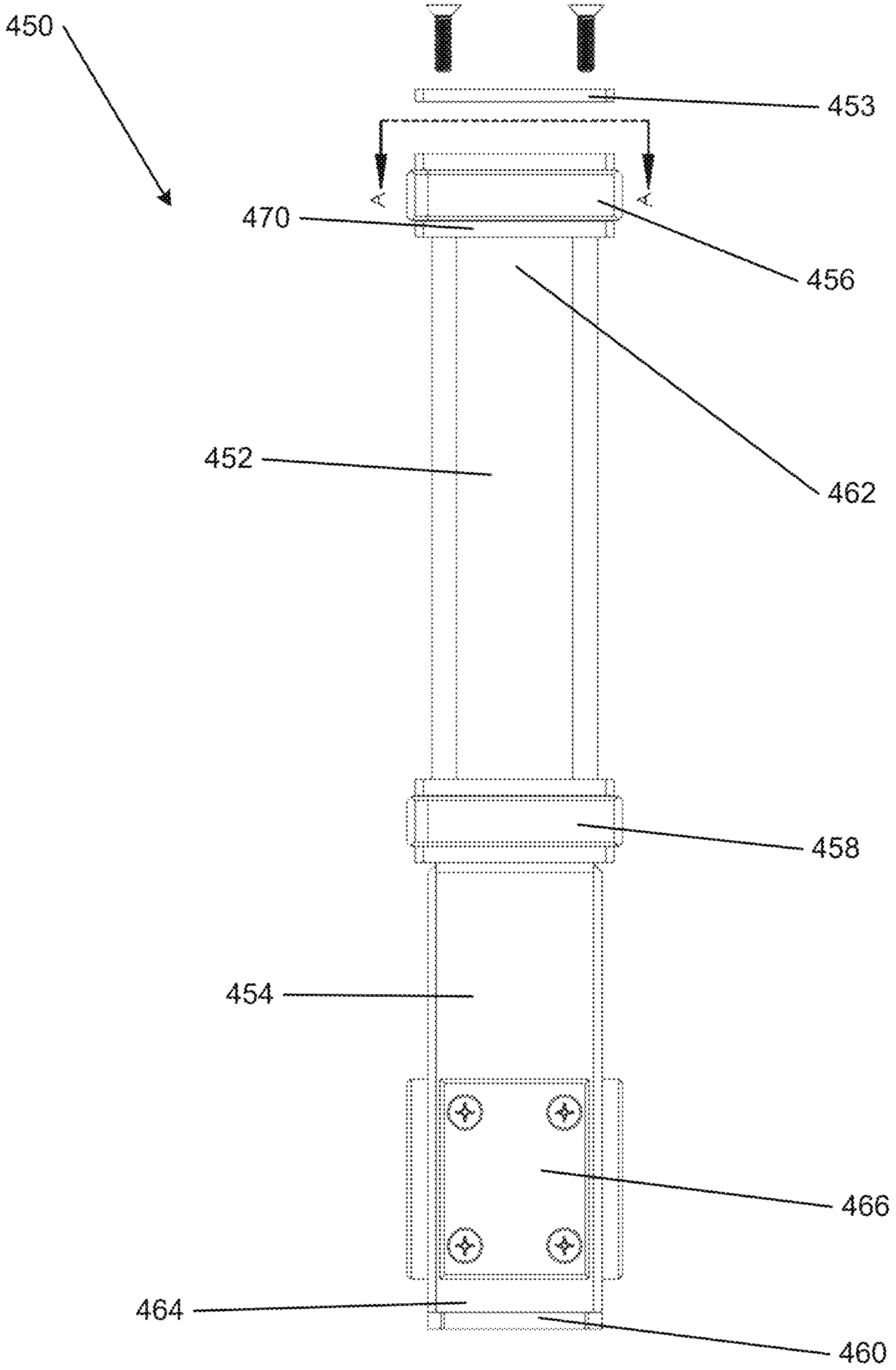
FIG. 8A depicts a front view of the lift tube assembly of the vertical displacement jack assembly from FIG. 1A, according to one or more aspects described herein.
Figure 8B:
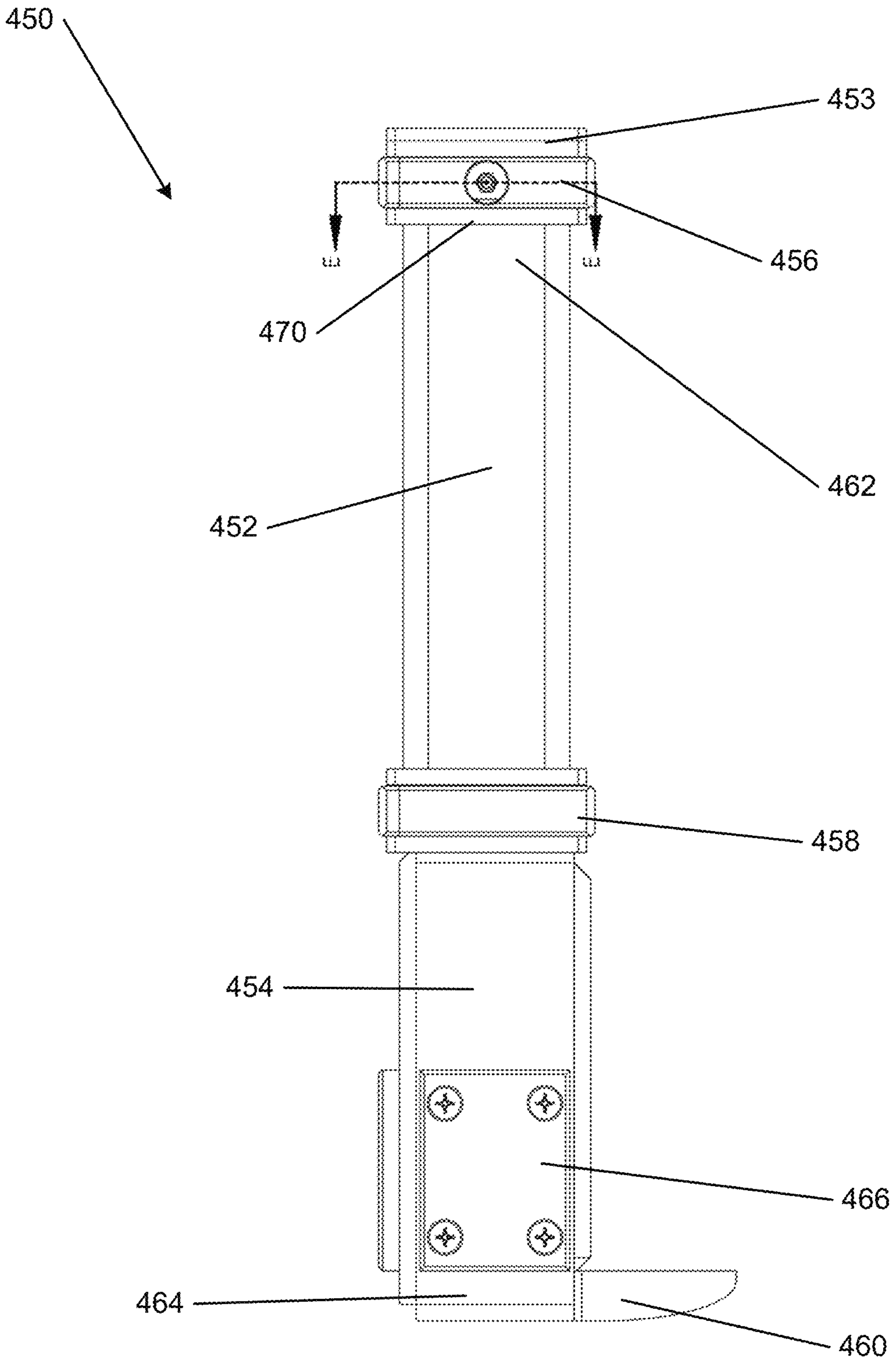
FIG. 8B depicts a side view of the lift tube assembly from FIG. 8A, according to one or more aspects described herein.
Figure 8E:
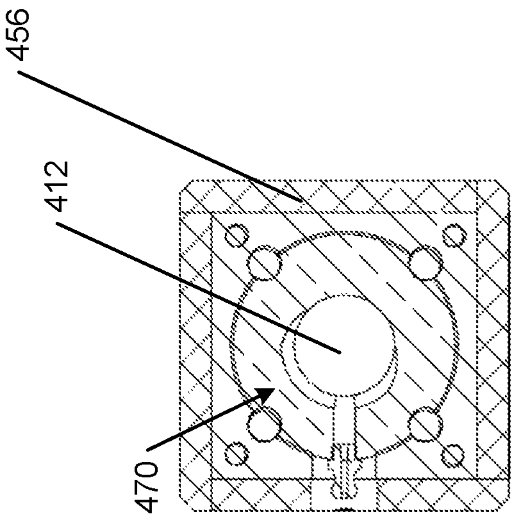
FIG. 8E depicts a cross-section view along line E-E from FIG. 8B of the lift tube assembly from FIG. 8A, according to one or more aspects described herein.
Figure 8D:
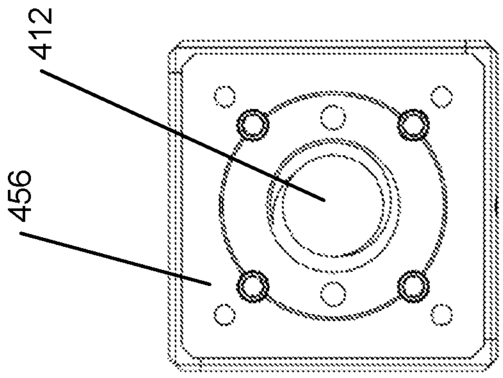
FIG. 8D depicts a cross-section view along line A-A from FIG. 8A of the lift tube assembly from FIG. 8A, according to one or more aspects described herein.
Figure 8C:
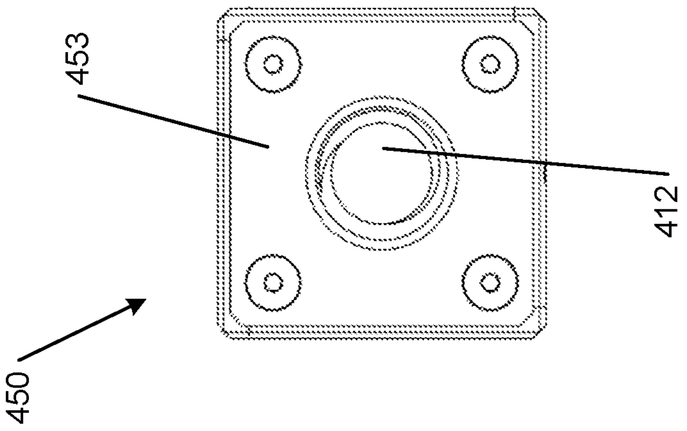
FIG. 8C depicts a top view of the lift tube assembly from FIG. 8A, according to one or more aspects described herein.
Figure 8F:
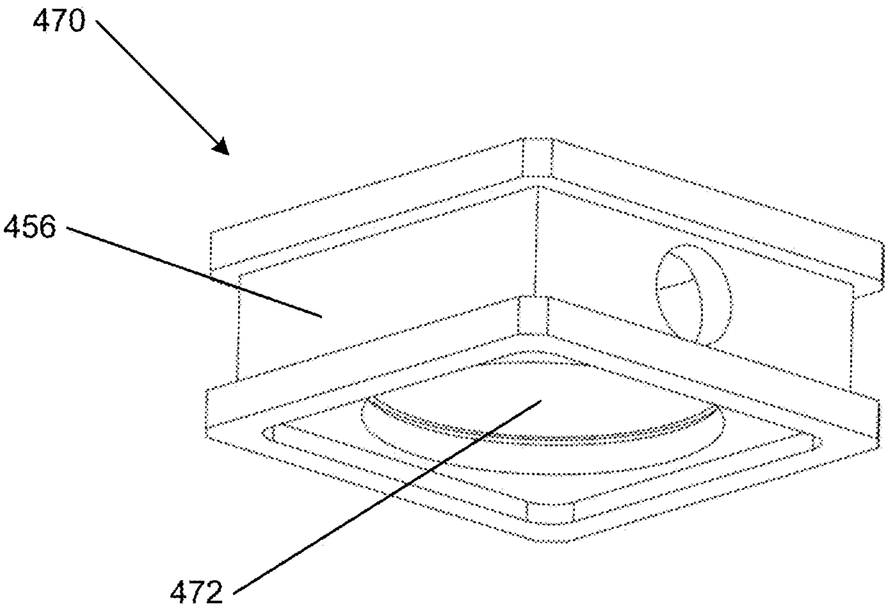
FIG. 8F depicts an upper tube guide block from the lift tube assembly from FIG. 8A, according to one or more aspects described herein.
Figure 8G:
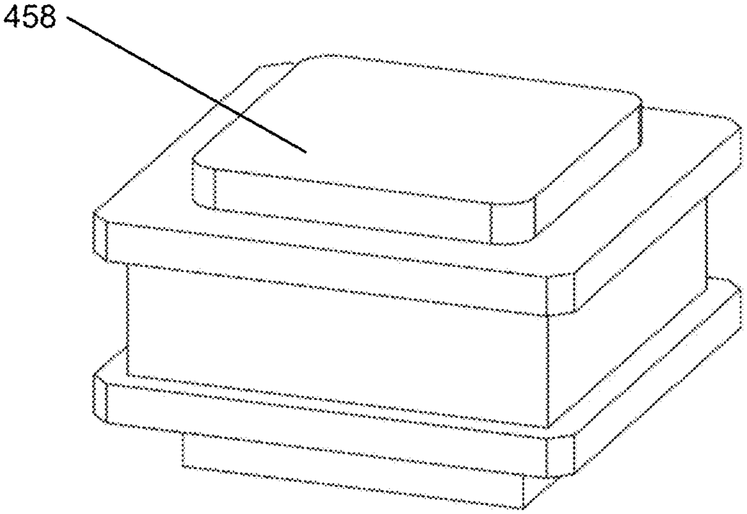
FIG. 8G depicts a lower tube guide block from the lift tube assembly from FIG. 8A, according to one or more aspects described herein.
Figure 9:
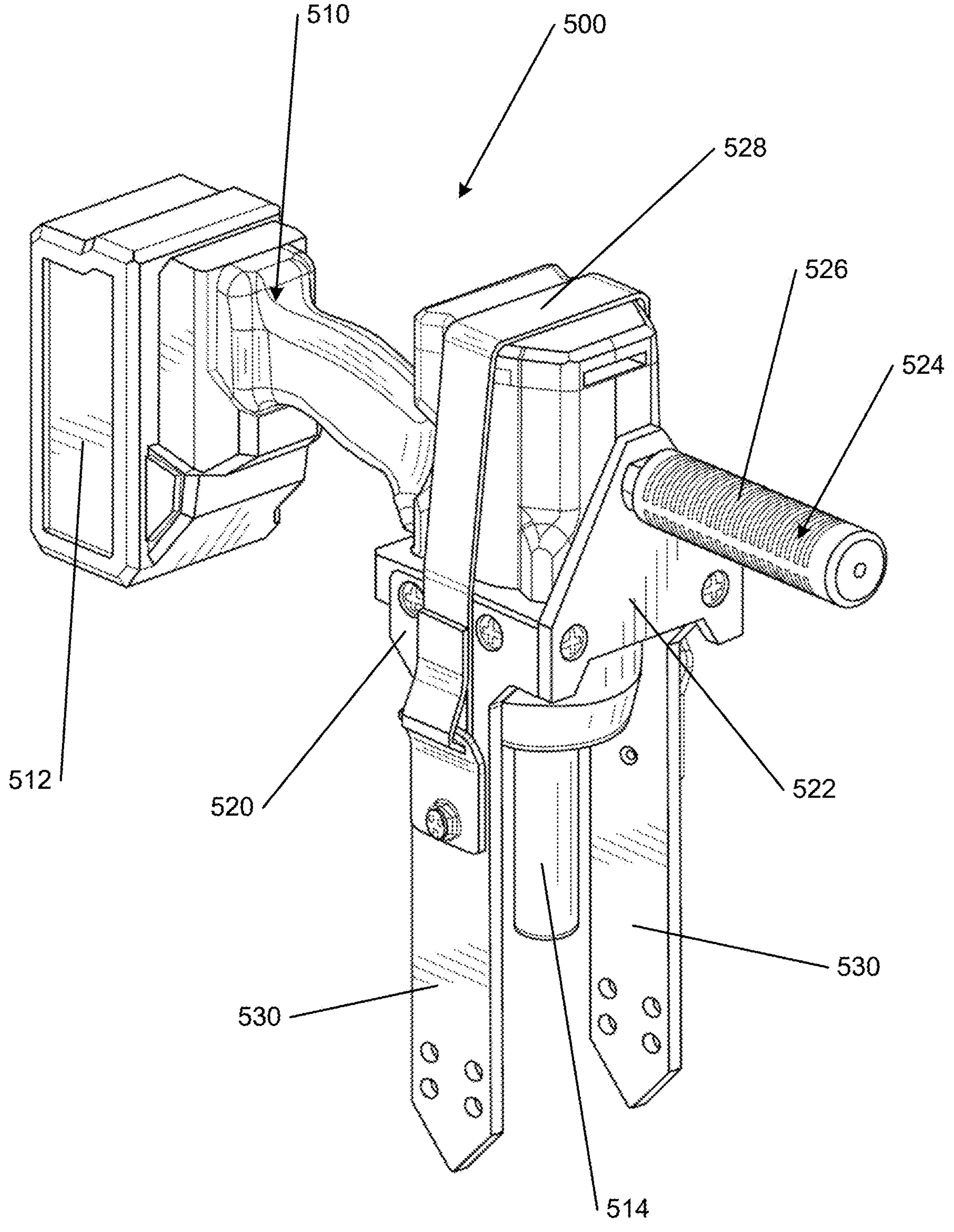
FIG. 9 depicts a side perspective view of an electric drive unit assembly from the rail lifting device from FIG. 1A, according to one or more aspects described herein.

FIGS. 1A-9 illustrate a rail lifting device 100 and components of the rail lifting device 100. Specifically, FIGS. 1A, 1B, 2A, 2B, and 2C depict the rail lifting device 100. The rail lifting device 100 may include an electric drive unit assembly 500 connected to a lift jack assembly 200, wherein the lift jack assembly 200 may comprise a housing assembly 300 and a vertical displacement jack assembly 400 that fits within the housing assembly 300. FIGS. 3A-5B depict the housing assembly 300 of the rail lifting device 100. FIGS. 6A-8G depict the vertical displacement jack assembly 400 of the rail lifting device 100. FIG. 9 depicts the electric drive unit assembly 500 of the rail lifting device 100.

Figure 2A:
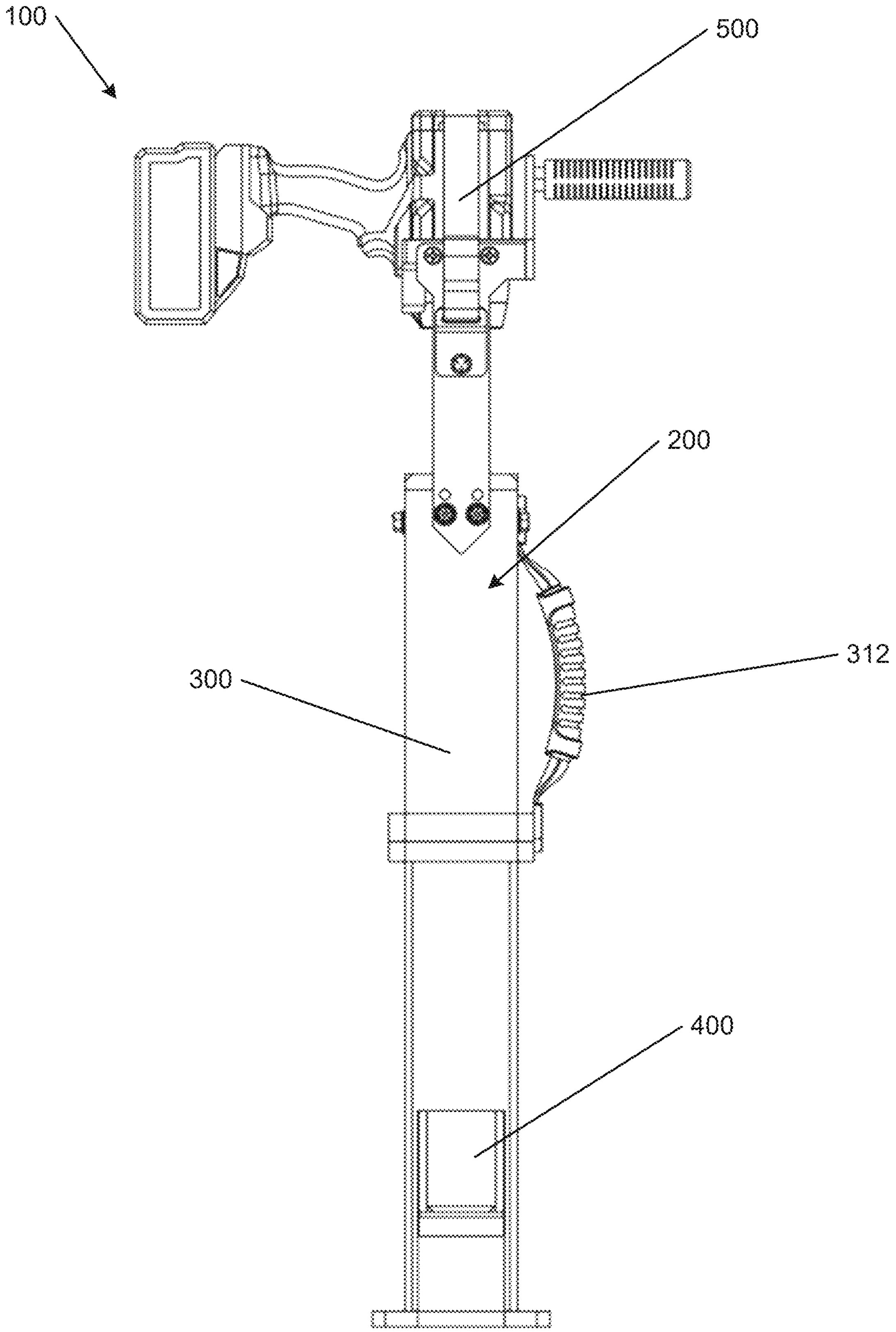
FIG. 2A depicts side view of the rail lifting device from FIG. 1A, according to one or more aspects described herein.
Figure 2B:
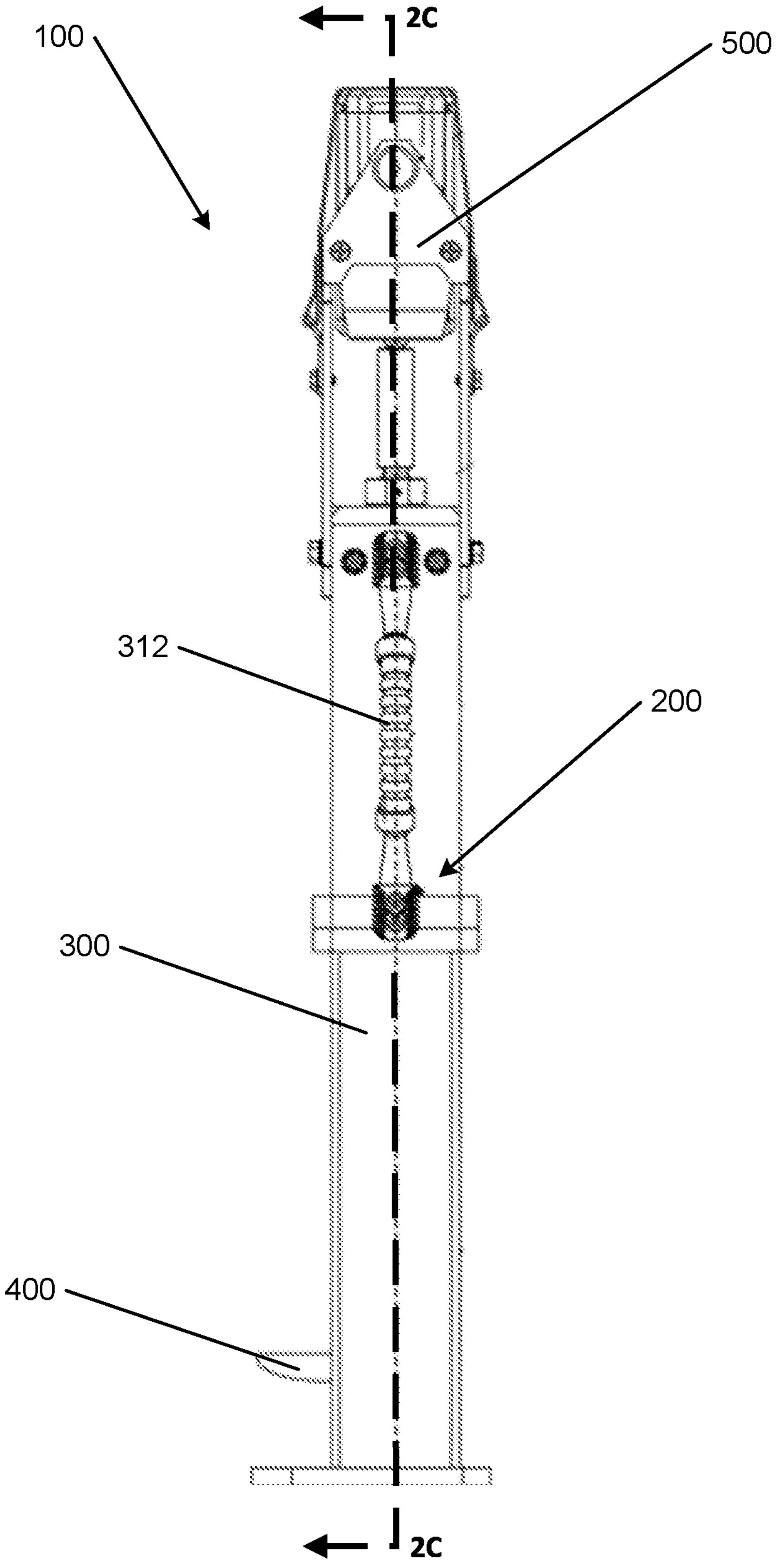
FIG. 2B depicts a front view of the rail lifting device from FIG. 1A, according to one or more aspects described herein.
Figure 2C:
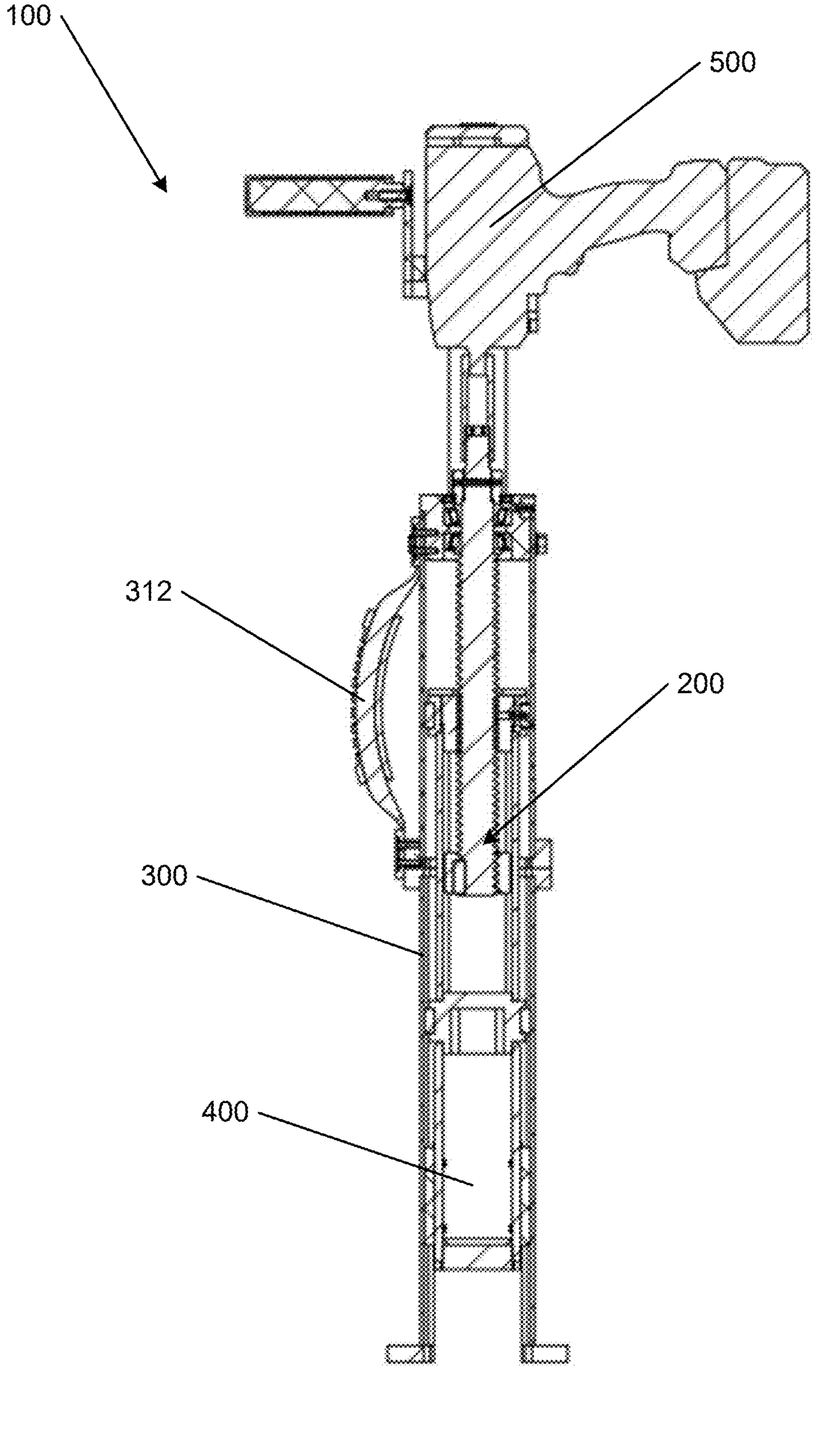
FIG. 2C depicts a cross-section view along 2C-2C from FIG. 2B of the rail lifting device from FIG. 1A, according to one or more aspects described herein.

As depicted in FIGS. 1A-2C, the rail lifting device 100 may include the electric drive unit assembly 500 connected to the lift jack assembly 200 with a vertical displacement jack assembly 400 that fits within the housing assembly 300. FIG. 1A depicts the rail lifting device 100 with the vertical displacement jack assembly 400 in a lowered configuration. FIG. 1B depicts the rail lifting device 100 with the vertical displacement jack assembly 400 in a raised configuration. FIGS. 2A and 2B depict the rail lifting device 100. FIG. 2C depicts a cross-section view of the rail lifting device 100.

As shown in the figures, the electric drive unit assembly 500 may be connected to the lift jack assembly 200. Specifically, one or more side plates 530 of the electric drive unit assembly 500 may connect to an upper housing assembly 310 of the housing assembly 300. Additionally, the electric drive unit assembly 500 may include a battery-powered electric drive unit 510 that is attached to an impact socket 514 which then connects to a drive element 422 of a drive shaft 412. When a user activates the battery-powered electric drive unit 510, the drive shaft 412 rotates within the housing assembly 300 and the vertical displacement jack assembly 400 to raise and lower a lift tube assembly 450 and a lift toe 460 to lift and/or stabilize the railway running rail. When the drive shaft 412 is rotated, the lift tube assembly 450 and the lift toe 460 may move inside the housing assembly 300 in a vertical direction. The rotation of the drive shaft 412 may displace the lift tube assembly 450 and the lift toe 460 in a linear and vertical manner relative to the housing assembly 300 in "' a displacement direction.

Figure 3A:
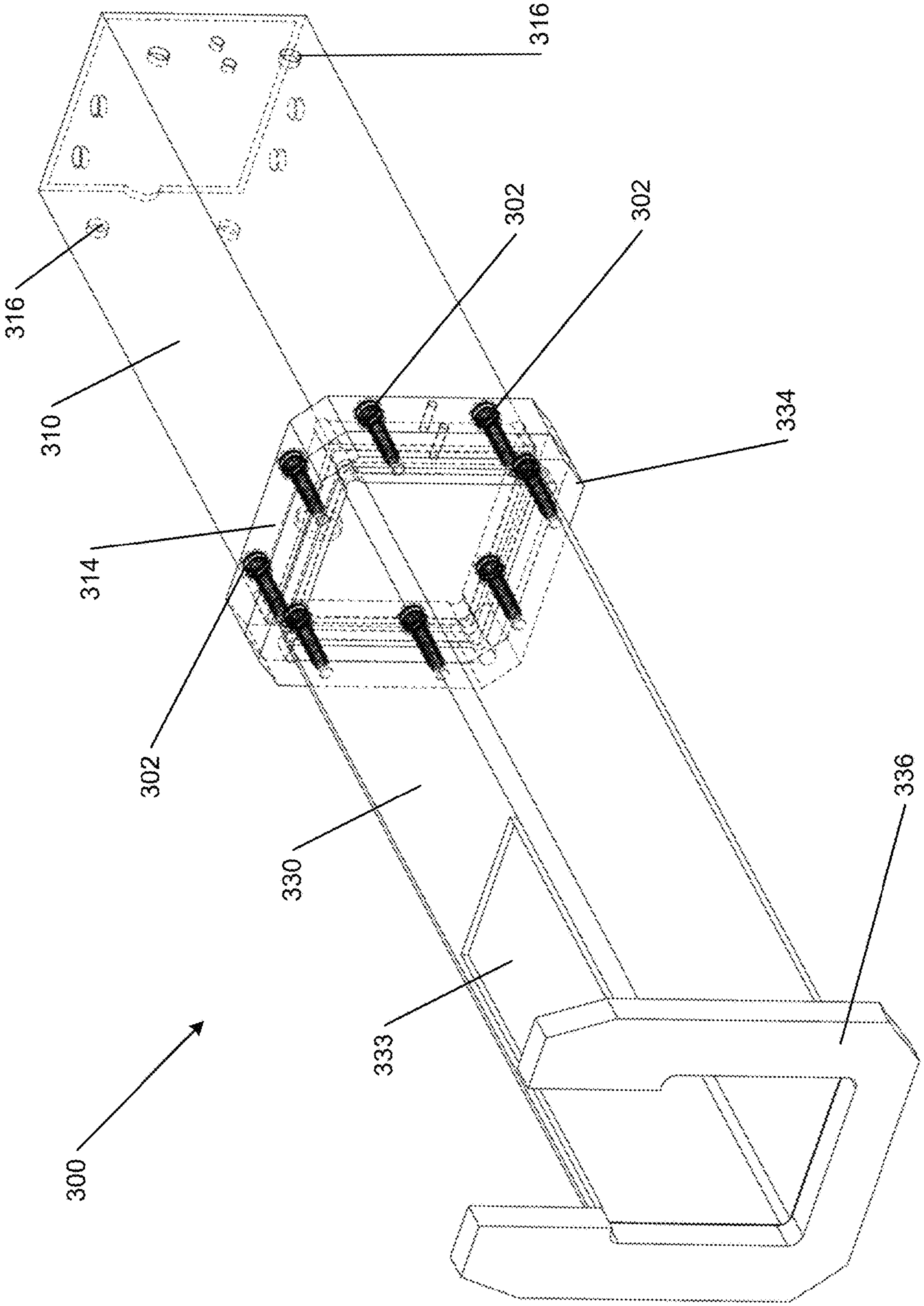
FIG. 3A depicts a side perspective view of the housing assembly of the rail lifting device from FIG. 1A, according to one or more aspects described herein.
Figure 3B:
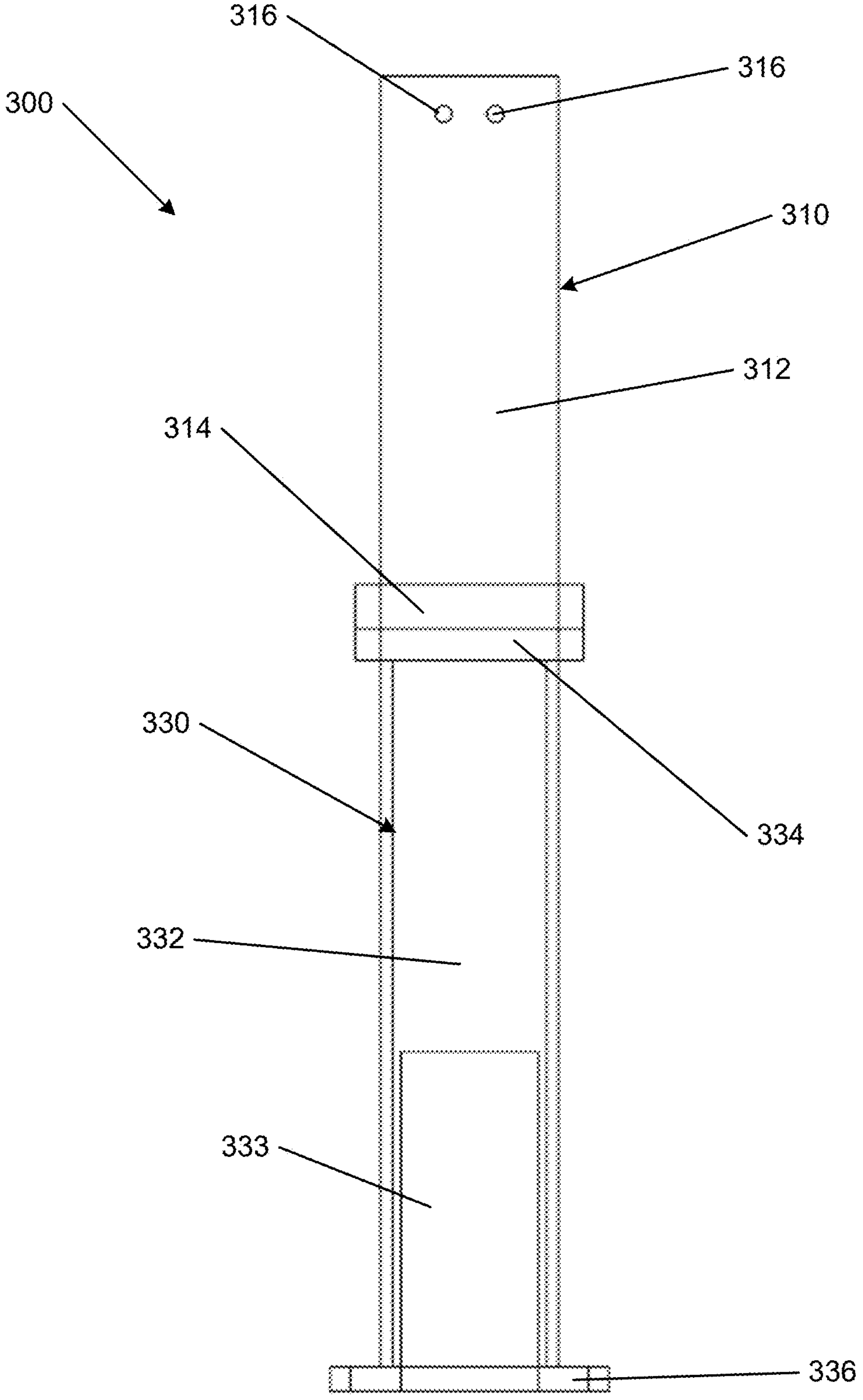
FIG. 3B depicts a side view of the housing assembly from FIG. 3A, according to one or more aspects described herein.
Figure 4A:
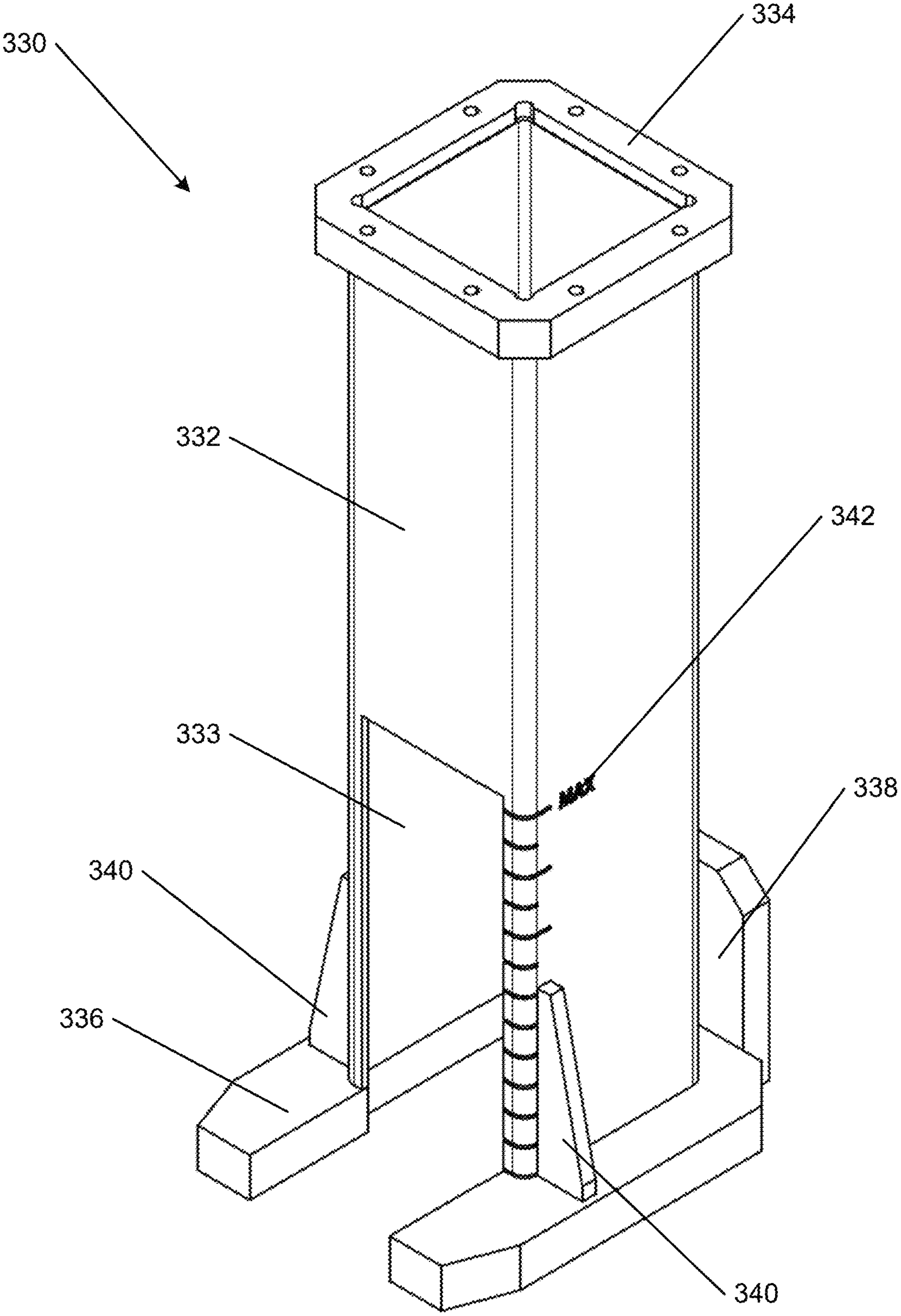
FIG. 4A depicts a front perspective view of a lower housing assembly from the housing assembly 300 from FIG. 3A, according to one or more aspects described herein.
Figure 4B:
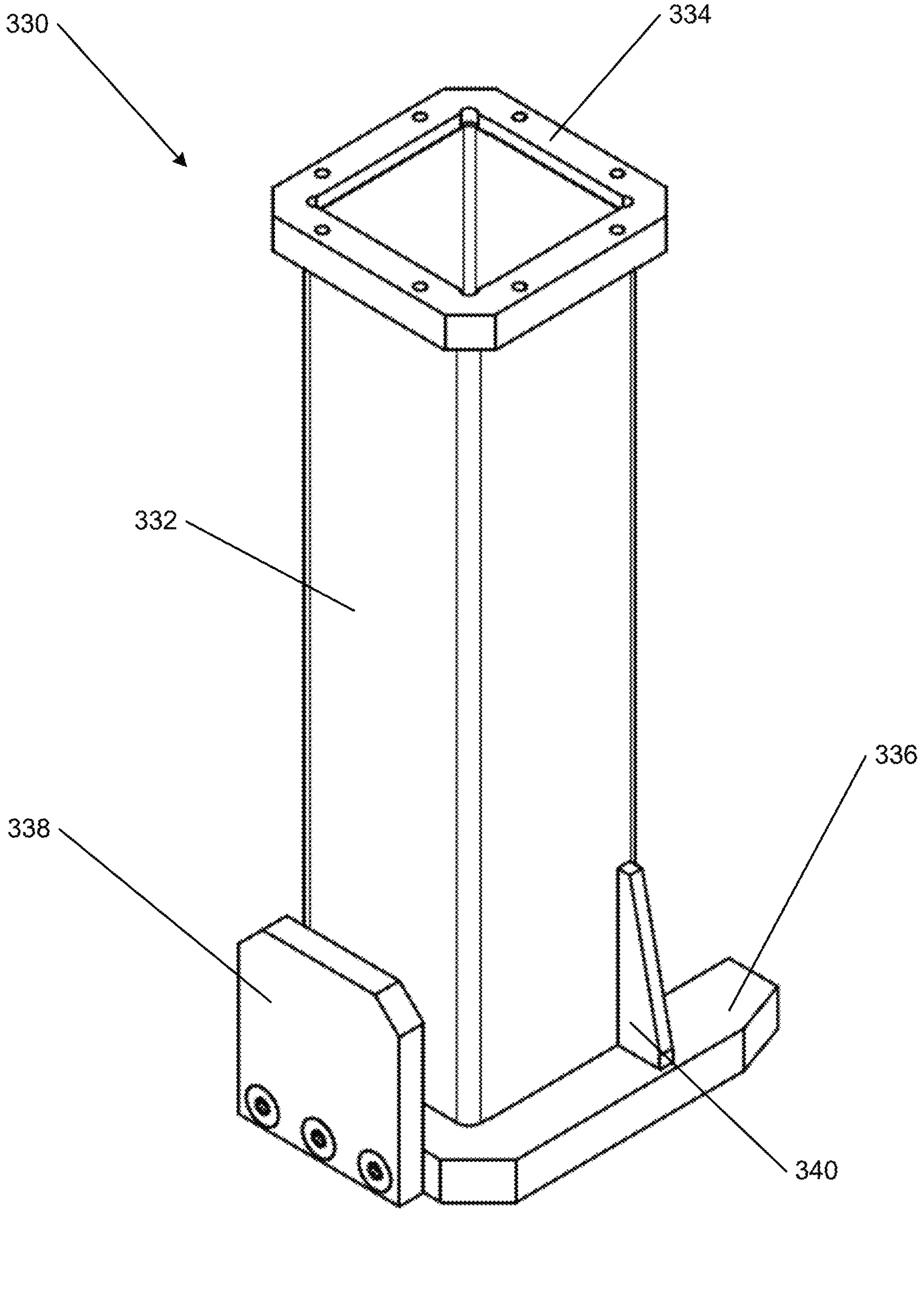
FIG. 4B depicts a rear perspective view of the lower housing assembly from FIG. 4A, according to one or more aspects described herein.
Figure 4C:
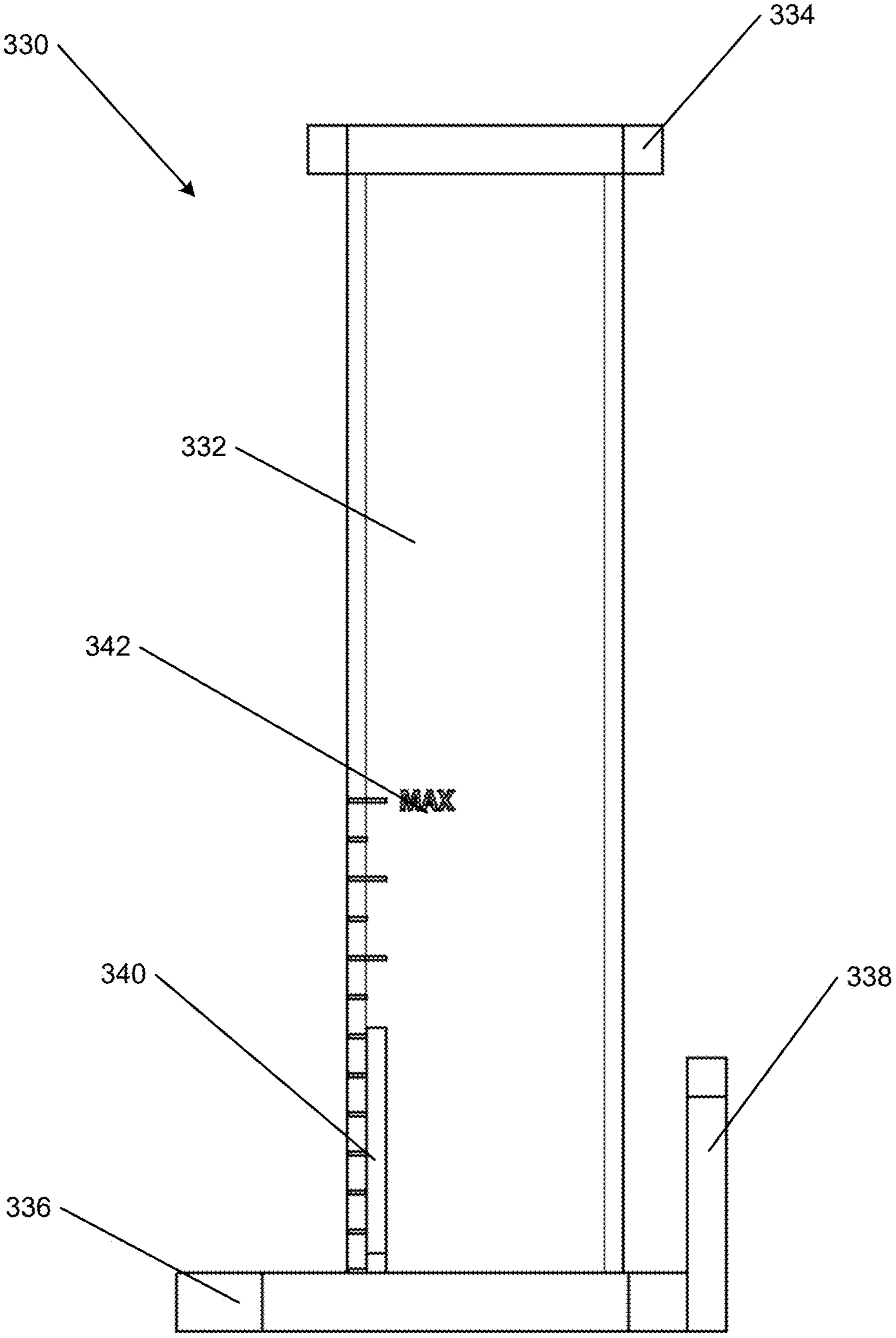
FIG. 4C depicts a side view of the lower housing assembly from FIG. 4A, according to one or more aspects described herein.
Figure 5A:
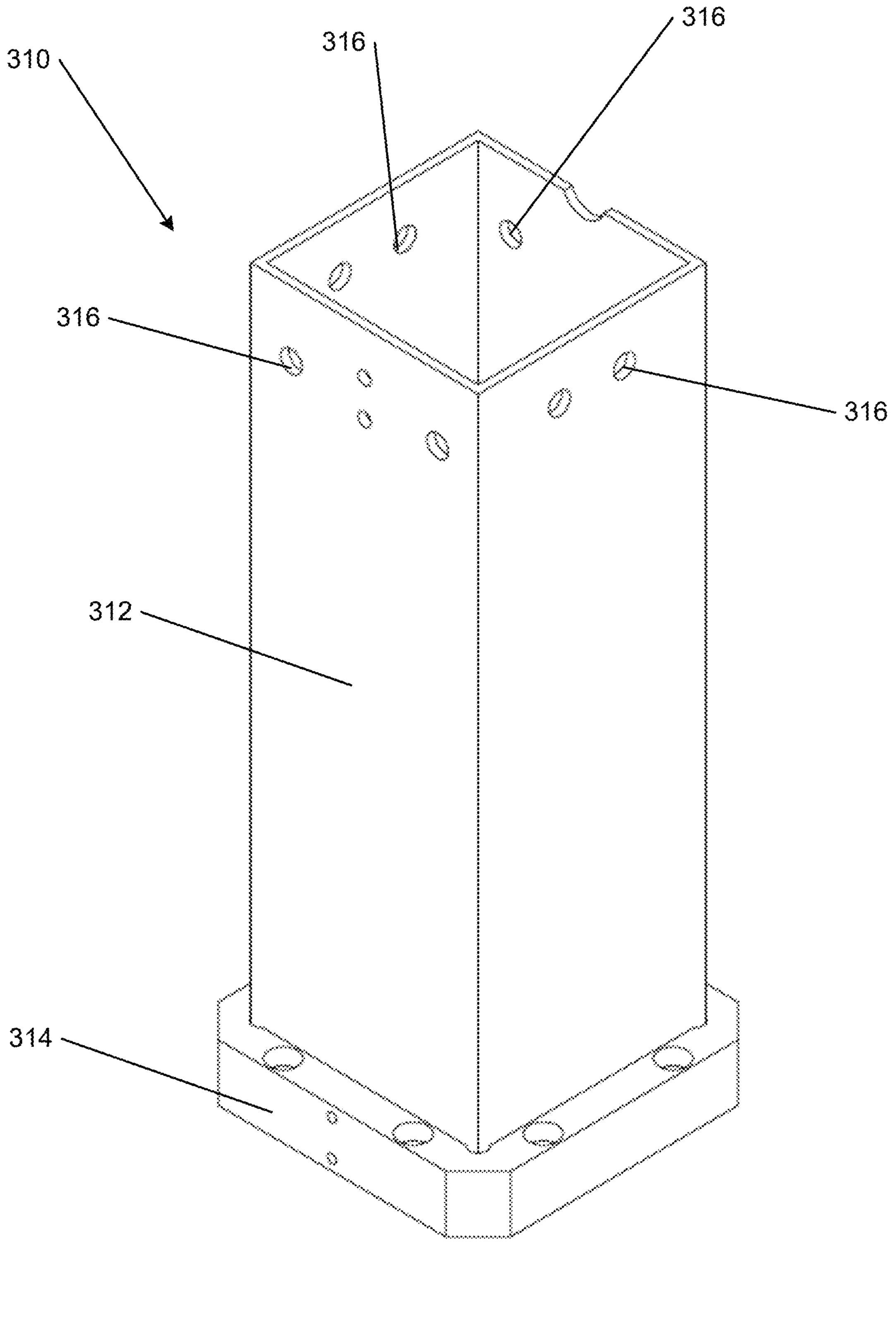
FIG. 5A depicts a perspective view of an upper housing assembly from the housing assembly from FIG. 3A, according to one or more aspects described herein.
Figure 5B:
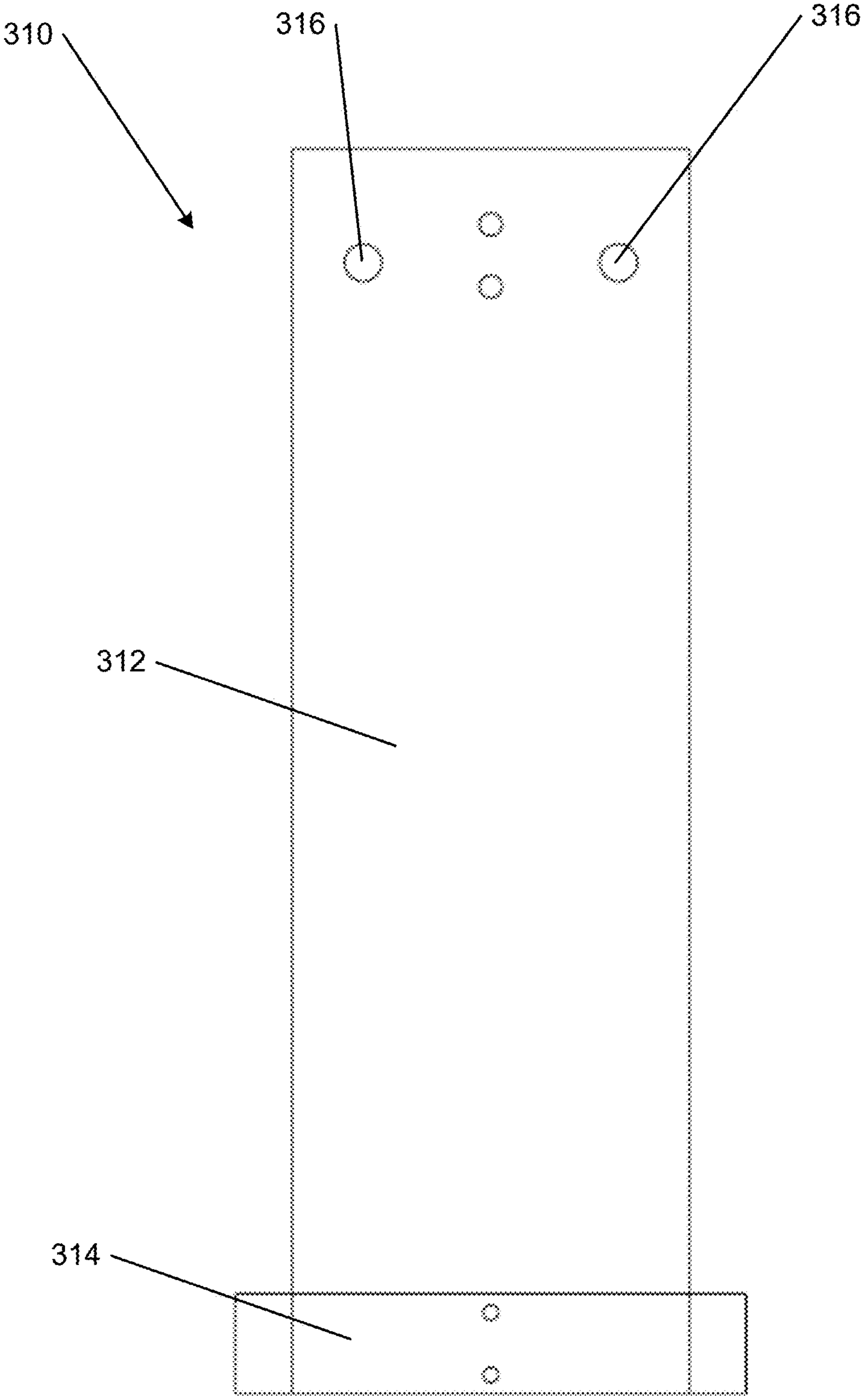
FIG. 5B depicts a side view of the upper housing assembly from FIG. 5A, according to one or more aspects described herein.

FIGS. 3A-5B depict the housing assembly 300. Specifically, FIGS. 3A and 3B depict the housing assembly 300. FIGS. 4A-4C depict a lower housing assembly 330 from the housing assembly 300. FIGS. 5A and 5B depict an upper housing assembly 310 from the housing assembly 300. Generally, the housing assembly 300 may contain and house the internal components of the rail lifting device 100 and the vertical displacement jack assembly 400.

The housing assembly 300 may include an upper housing assembly 310 and a lower housing assembly 330. As illustrated in FIGS. 3A-5B, the upper housing assembly 310 and the lower housing assembly 330 may include a plurality (four) of substantially vertical side walls. The housing assembly 300 may have a height of approximately 26 inches or within a range of 16 to 40 inches or any height. The upper housing assembly 310 may have a height of approximately 11 inches or within a range of 6 to 18 inches or any height. The lower housing assembly 330 may have a height of approximately 15 inches or with a range of 10 to 22 inches or any height. As shown in the exemplary embodiment shown in FIGS. 3A-5B, the housing assembly 300, the upper housing assembly 310, and the lower housing assembly 330 may generally have a square cross-sectional shape. For example, as shown in FIGS. 3A-5B, the housing assembly 300, the upper housing assembly 310, and the lower housing assembly 330 may have four side walls. Each side wall may have a width of approximately 3.5 inches or within a range of 3 inches to 4 inches, or within a range of 2 inches to 6 inches. Additionally, the upper housing assembly 310 may include a housing handle 312 attached to the upper housing assembly 310. The lower housing assembly 330 may also include a housing handle 312 without departing from the invention.

As illustrated in FIGS. 4A, 4B, and 4C, the lower housing assembly 330 may include a lower housing or lower tube 332. The lower housing 332 may include a lower housing flange 334 located on a first end and a foot plate 336 located on a second end opposite the first end. The lower housing flange 334 may be configured to connect to the upper housing flange 314 to secure the lower housing assembly 330 to the upper housing assembly 310. The foot plate 336 may be U-shaped and configured to sit on the ground when using the rail lifting device 100. The foot plate 336 may extend around the bottom edge of the side walls of the lower housing assembly 330. The foot plate 33 may specifically extend around three of the sidewalls with the jack opening 333 matching the open side of the U-shape of the foot plate 336.

Additionally, the lower housing assembly 330 may include an impact plate 338 located on the second end and on a rear portion of the lower housing assembly 330. The impact plate 338 may be configured to kick or push the foot plate 336 and the rail lifting device 100 under the rail. The impact plate 338 may be offset from the rear sidewall of the lower housing assembly 330. Additionally, the lower housing assembly 330 may include one or more buttress plates 340 that may be used to provide additional structural support for the lower housing assembly 330. The one or more buttress plates 340 may be located and span between the lower housing 332 and the foot plate 336. Additionally, as shown in FIGS. 4A and 4C, the lower housing assembly 330 may include measurement markings 342 showing the range of movement for the rail lifting device 100. Additionally, the lower housing assembly 330 and the lower housing 332 may include a jack opening 333. The jack opening 333 may be sized and configured to fit the lift toe 460 which is utilized to lift and/or stabilize the rail. For example, the jack opening 333 may be approximately 2.75 inches wide and 6.25 inches tall or within a range of 1 to 6 inches wide and 3 to 12 inches tall. Any size jack opening 333 that matches the size of the lift toe 460 may be utilized without departing from this invention.

As illustrated in FIGS. 5A and 5B, the upper housing assembly 310 may include an upper housing or upper tube 312. The upper housing 312 may include an upper housing flange 314 located on a first end of the upper housing 312. The upper housing flange 314 may be configured to connect to the lower housing flange 334 to secure the upper housing assembly 310 to the lower housing assembly 330. One or more fastener holes 316 may be located on a second end opposite the first end of the upper housing 312. The one or more fastener holes 316 may be configured to attach and connect the one or more side plates 530 and the electric drive unit assembly 500 to the housing assembly 300 for the rail lifting device 100.

As further shown in FIGS. 3A and 3B, the upper housing assembly 310 and the lower housing assembly 330 may be connected using the upper housing flange 314 and the lower housing flange 334. A plurality of fasteners 302 may be utilized to connect the upper housing flange 314 and the lower housing flange 334.

Figure 6A:
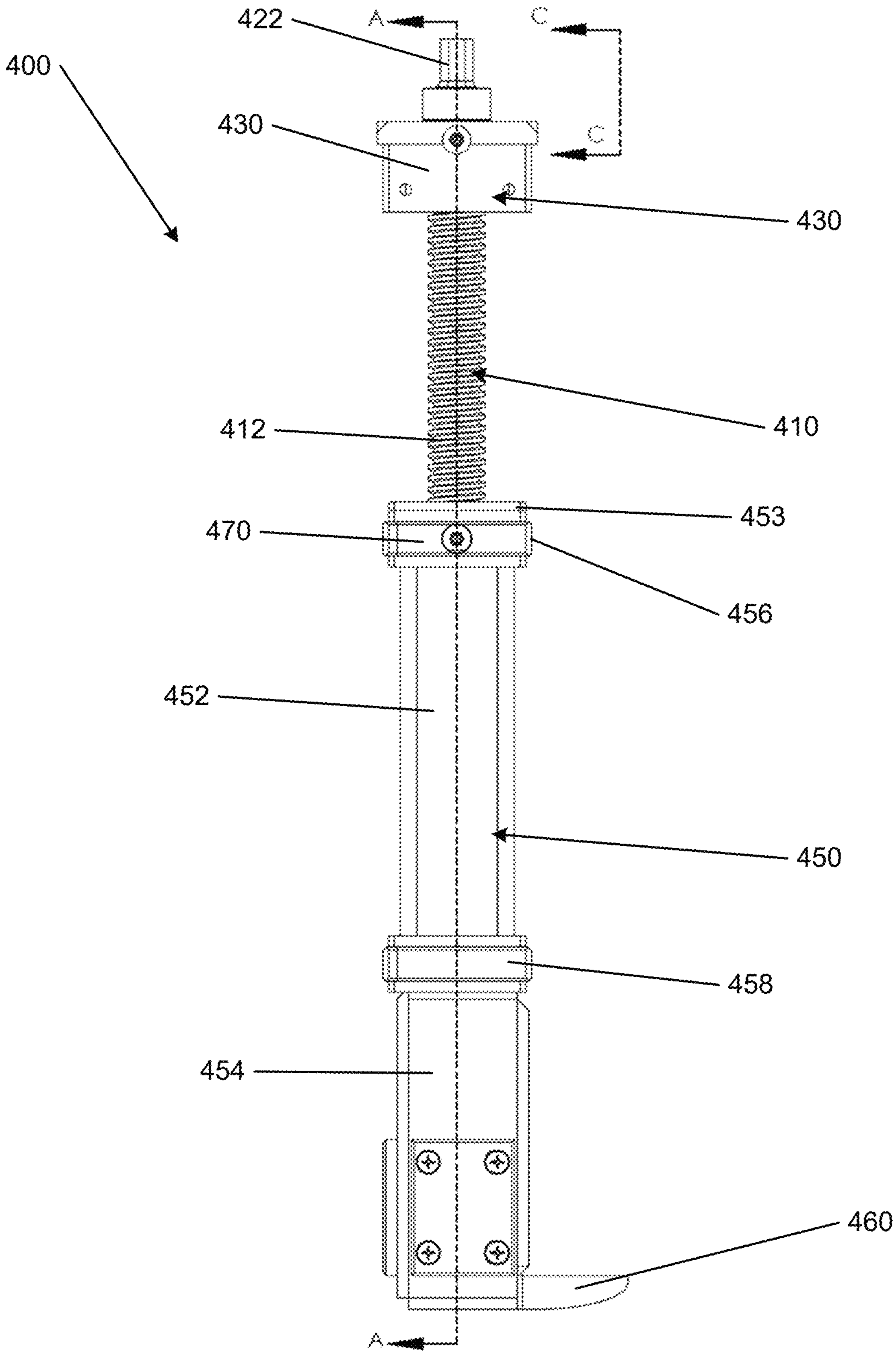
FIG. 6A depicts a front view of the vertical displacement jack assembly from the rail lifting device from FIG. 1A, according to one or more aspects described herein.
Figure 6B:
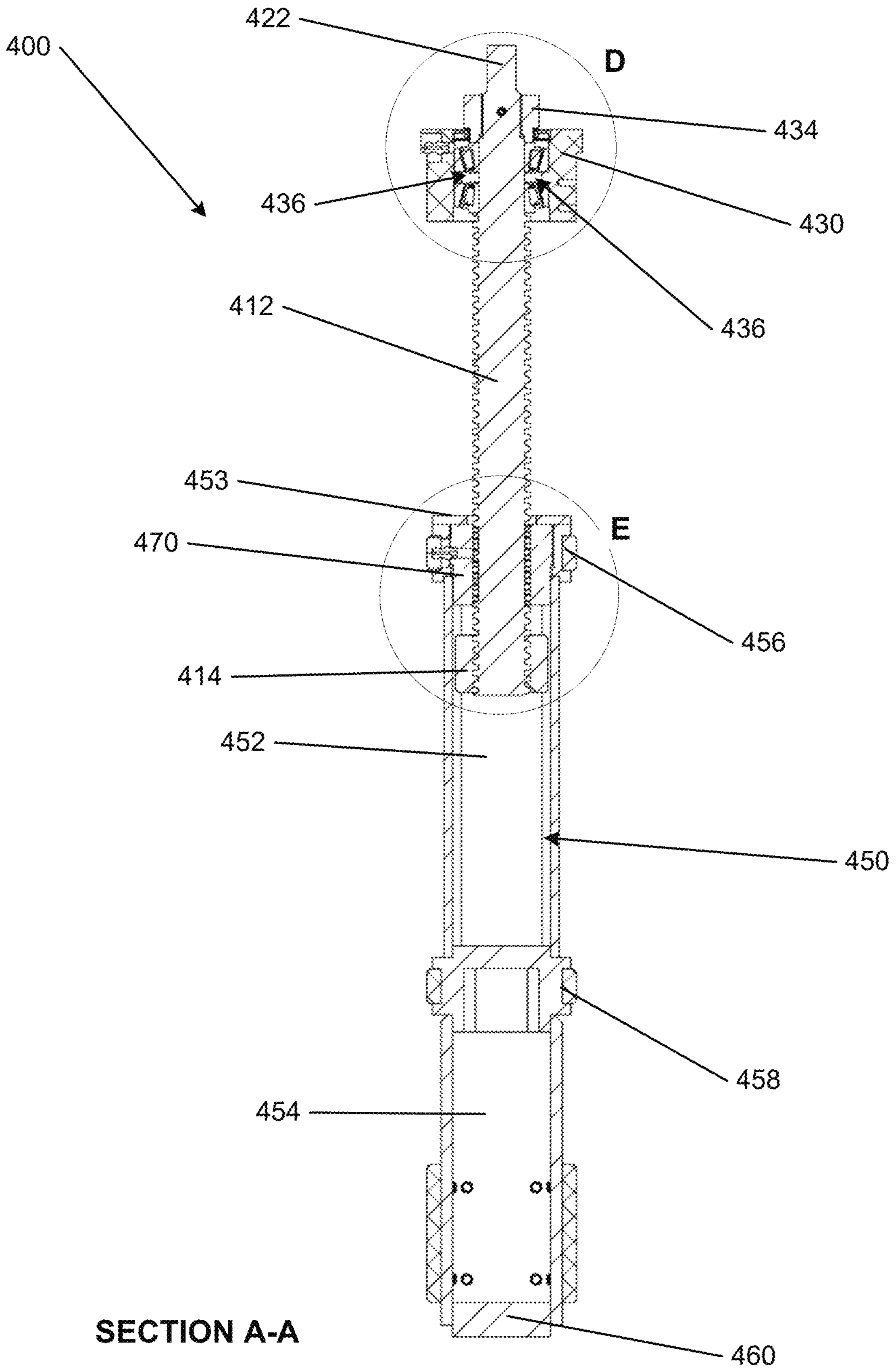
FIG. 6B depicts a cross-section view along A-A from FIG. 6A of the vertical displacement jack assembly from FIG. 6A, according to one or more aspects described herein.
Figure 6C:
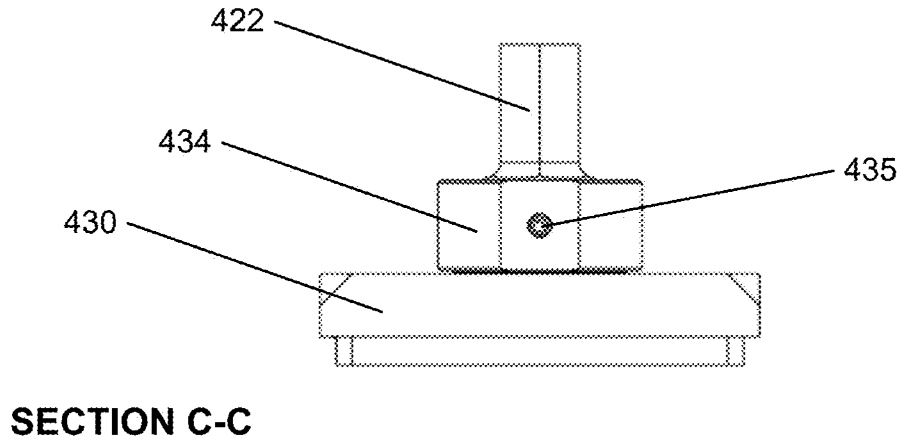
FIG. 6C depicts a cross-section view along C-C from FIG. 6A of the upper portion of the vertical displacement jack assembly from FIG. 6A, according to one or more aspects described herein.
Figure 6D:
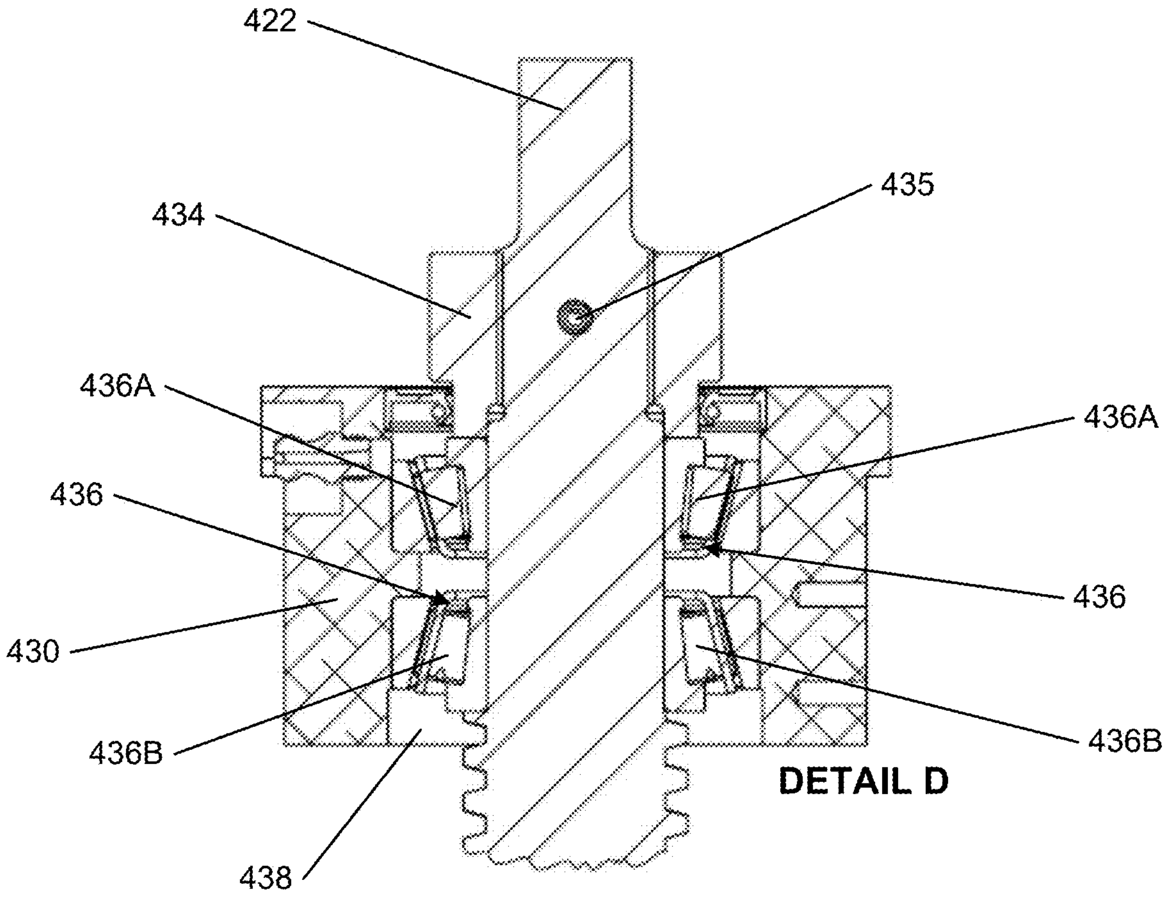
FIG. 6D depicts a detailed view from DETAIL D from FIG. 6B of a bearing block portion of the vertical displacement jack assembly from FIG. 6A, according to one or more aspects described herein.
Figure 6E:
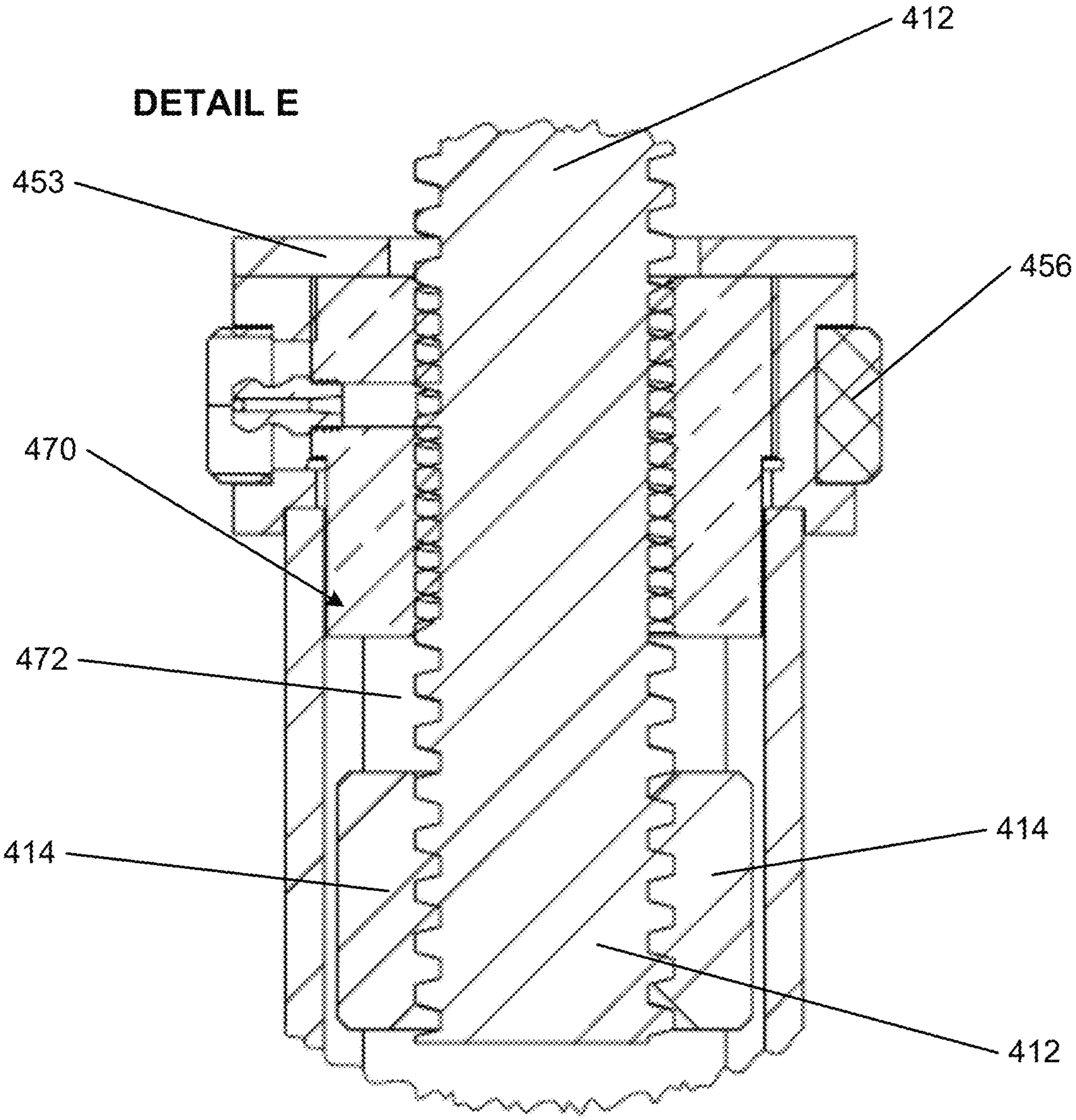
FIG. 6E depicts a detailed view from DETAIL E from FIG. 6B of a mounting flange portion of the vertical displacement jack assembly from FIG. 6A, according to one or more aspects described herein.
Figure 6F:
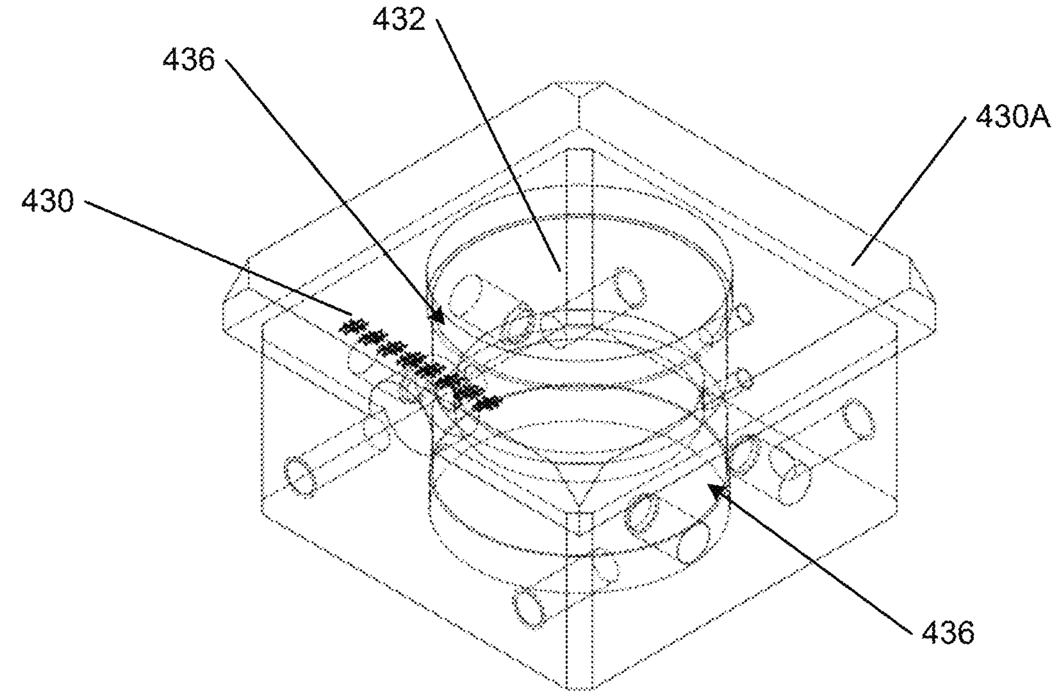
FIG. 6F depicts a side perspective view of the bearing block of the vertical displacement jack assembly from FIG. 6A, according to one or more aspects described herein.
Figure 6G:
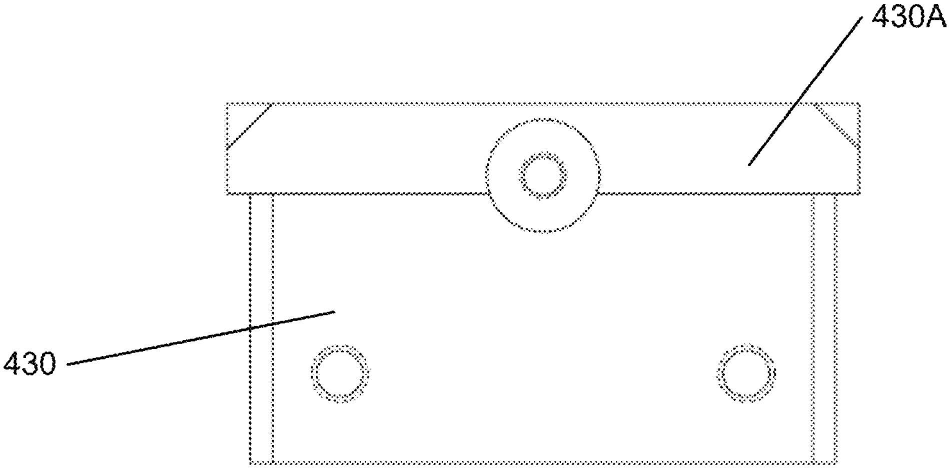
FIG. 6G depicts a side view of the bearing block from FIG. 6F, according to one or more aspects described herein.

FIGS. 6A-8G depict the vertical displacement jack assembly 400 of the rail lifting device 100. As shown in these figures, the vertical displacement jack assembly 400 may include a screw shaft assembly 410, a bearing block 430, and a lift tube assembly 450. Specifically, FIG. 6A depicts the vertical displacement jack assembly 400. FIGS. 6B and 6C depict cross-section views of the vertical displacement jack assembly 400. FIG. 6D depicts a detailed view from DETAIL D from FIG. 6B of a bearing block portion of the vertical displacement jack assembly 400. FIG. 6E depicts a detailed view from DETAIL E from FIG. 6B of a mounting flange portion of the vertical displacement jack assembly 400. FIGS. 6F and 6G depict the bearing block of the vertical displacement jack assembly 400. FIGS. 7A-7C depict the screw shaft assembly 410 of the vertical displacement jack assembly 400. FIGS. 8A-8C depict the lift tube assembly 450 of the vertical displacement jack assembly 400. FIGS. 8D and 8E depict cross-section views of the lift tube assembly 450 of the vertical displacement jack assembly 400. FIGS. 8F and 8G depict the upper tube guide block and the lower tube guide block from the lift tube assembly 450.

The vertical displacement jack assembly 400 may include the screw shaft assembly 410, the bearing block 430, and the lift tube assembly 450. Generally, the vertical displacement jack assembly 400 may be mounted within the housing assembly 300 and include a hollow lift tube assembly 450 guided in the housing assembly 300. The vertical displacement jack assembly 400 may include a mounting flange 470 and a screw shaft assembly 410, with the mounting flange 470 located between the screw shaft assembly 410 and the lift tube assembly 450, with the mounting flange 470 located completely within the lift tube assembly 450. Further, the vertical displacement jack assembly 400 may vertically displace and move in a linear direction the lift toe 460 relative to the housing assembly 300 when the drive shaft 412 is rotated.

FIGS. 6B, 7A, 7B, and 7C depict the screw shaft assembly 410 and components of the screw shaft assembly 410 as part of the vertical displacement jack assembly 400. Specifically, the screw shaft assembly 410 may include a drive shaft 412 and a screw stop 414. The drive shaft 412 may include a first end 416 and a second end 418 opposite the first end 416. Near the first end 416, the drive shaft 412 may extend through an opening 432 in the bearing block 430, and sealed by a sealed shaft top nut 434. As further illustrated in FIG. 6B, near the second end 418 for the drive shaft 412, the drive shaft 412 may connect to a mounting flange 470. The drive shaft 412 may be secured to the mounting flange 470 using the screw stop 414. As depicted in FIG. 7B, the screw stop 414 may also include a dowel pin 420 to lock the screw stop 414 to the drive shaft 412.

The drive shaft 412 may be partially threaded. As shown in FIGS. 7A-7C, the drive shaft 412 may include a plurality of distinct diameter regions. For example, the drive shaft 412 may include a first region 412A with a first diameter corresponding to the threaded region, a second region 412B having a second diameter with a smooth surface, and a third region 412C which may include a third diameter. The first diameter may be greater than both the second diameter and the third diameter. The first diameter may be approximately 1 inch or within a range of 0.75 inches and 1.5 inches or within a range of 0.5 inches to 2.0 inches. The threaded portion (first region 412A) may be ACME threads or other similar threads. Alternatively, the drive shaft 412 may include two distinct diameter regions or four distinct diameter regions.

The first end 416 of the drive shaft 412 may include a drive element 422 to allow a user to engage the drive shaft 412 with a battery-powered electric drive unit 510, or similar device to rotate the drive shaft 412. As shown in FIGS. 7A and 7C, the drive element 422 may have a hexagonal shape to be engaged by a standard hexagonal socket. The standard hexagonal socket may be 0.5 inches or larger. The battery-powered electric drive unit 510 may engage the drive shaft 412 and rotate the drive shaft 412 to move the drive shaft 412 up and down.

FIGS. 6C, 6D, 6F and 6G depict the bearing block 430 and components of the bearing block 430 as part of the vertical displacement jack assembly 400. The bearing block 430 may be connected to the upper housing assembly 310 and include an opening 432 for inserting the drive shaft 412. The drive shaft 412 may also extend through one or more bearings 436 secured in the bearing block 430 by a sealed shaft top nut 434. Additionally, the bearing block 430 may include a seal around the drive shaft 412 and against the sealed shaft top nut 434, such as a spring-loaded rotary shaft seal 440. The sealed shaft top nut may include one or more set screws and/or coiled spring pins 435.

The bearing block 430 may be integrally joined to the first end of the upper housing assembly 310 and the housing assembly 300. Alternatively, the bearing block 430 and the upper housing assembly 310 may be formed as a single piece. The bearing block 430 may include an opening 432. The opening 432 may be located in the geometric center of the bearing block 430 and may have a cylindrical shape to allow the drive shaft 412 to extend through the bearing block 430. The opening 432 may extend through both ends of the bearing block 430. In addition, the bearing block 430 may include a cavity 438 that is concentric with the opening 432. The cavity 438 may be sized to contain one or more bearings 436 and have a cylindrical shape that is open at one end with a surface at the opposite end to engage one end of the one or more bearings 436. The bearing block 430 may also include a plurality of holes around the perimeter of the bearing block 430. The plurality of holes may be threaded to releasably connect a cap plate 430A to the bearing block 430. In one example, the one or more bearings 436 may be a roller bearing or bushing, such as a tapered roller bearing or bushing. As shown in FIG. 6D, the bearing block 430 may include an upper tapered roller bearing 436A and a lower tapered roller bearing 436B. The one or more bearings 436 may enable the drive shaft 412 to rotate freely when the one or more bearings 436 is installed onto the drive shaft 412 and into the bearing block 430. Additionally, the bearing block 430 may include a seal around the drive shaft 412, such as a spring-loaded rotary shaft seal 440.

FIGS. 6A, 6B, and 8A-8G depict the lift tube assembly 450 and components of the lift tube assembly 450 as part of the vertical displacement jack assembly 400. The lift tube assembly 450 may generally include a lifting L-shaped structure or lift toe 460 coupled to the drive shaft 412 and the screw shaft assembly 410. The lift tube assembly 450 and the lift toe 460 may be configured to extend and retract vertically within a range of approximately seven inches from a ground-zero starting position to elevate and stabilize a railway running rail segment to a predetermined height without manual bending or lifting. The lift tube assembly 450 and the lift toe 460 may extend and retract vertically other dimensions, such as 2-6 inches, 2-9 inches, 2-12 inches or more without departing from this invention. The lift tube assembly 450 and the lift toe 460 may be configured to slide under a railway running rail segment from ground level, initiating lift without operator strain, and the rail lifting device 100 may include dual functionality for both elevating and stabilizing the rail segment during maintenance tasks.

The lift tube assembly 450 may include an upper torque tube 452 and a lower torque tube 454. The lower torque tube 454 may be connected to the upper torque tube 452 with the lift toe 460 extending from the lower torque tube 454. The upper torque tube 452 may also include a lift tube cover 453 that covers the upper torque tube 452. As depicted in FIGS. 8A, 8B, 8F, and 8G, the lift tube assembly 450 may also include an upper tube guide block 456 and a lower tube guide block 458. The upper tube guide block 456 and the lower tube guide block 458 may provide structural stability to the lift tube assembly 450. The upper tube guide block 456 and the lower tube guide block 458 may be sized, shaped, and configured to fit within the upper housing assembly 310 and lower housing assembly 330 of the housing assembly 300. The lift tube assembly 450 may include a first end 462 and a second end 464 opposite the first end 462. The first end 462 may include the upper torque tube 452 and the upper guide block 456. The second end 464 may include the lower torque tube 454 and the lift toe 460. The upper torque tube 452 and the lower torque tube 454 may be connected by the lower guide block 458. Additionally, the lower torque tube 454 may include one or more lift tube plates 466 located at a bottom portion of the lower torque tube 454. The one or more lift tube plates 466 may provide additional structural support and protection for the lift tube assembly 450.

Generally, the lift tube assembly 450 may be fabricated in various ways, such as a tube weldment with multiple sides of the lift tube components welded to the upper tube guide block 456 and the lower tube guide block 458. Additionally, the lift toe 460 may be welded to the lower torque tube 454. Other methods of fastening or fabricating the lift tube assembly 450 may be utilized without departing from this invention.

As illustrated in FIGS. 6A, 6B, 6E, and 8F, the upper guide block 456 may include a mounting flange 470. The drive shaft 412 may connect to the mounting flange 470. The mounting flange 470 may have a centrally located aperture 472 to connect the drive shaft 412. The mounting flange 470 may be connected to the drive shaft 412 in a plurality of ways. For example, the aperture 472 may be threaded to directly engage the drive shaft 412, or alternatively as shown in FIG. 4, a screw stop 414 may be connected to the aperture 472 of the mounting flange 470 where the drive shaft 412 may connect to the mounting flange 470 with the screw stop 414 positioned between the mounting flange 470 and the drive shaft 412. The screw stop 414 may be integrally joined to the mounting flange 470 or some may be connected using an anti-rotation element to prevent the screw stop 414 from rotating in relation to the mounting flange 470 when the drive shaft 412 is rotated, such as a set screw.

As shown in FIG. 9, an electric drive unit assembly 500 may include a battery-powered electric drive unit 510. In one example, the battery-powered electric drive unit 510 may be a battery-operated drill-type tool. In another example, the battery-powered electric drive unit 510 may be an integrated electric motor and gearbox. The battery-powered electric drive unit 510 may be connected to the drive shaft 412 to rotate the drive shaft 412. The first end 416 of the drive shaft 412 may have a drive element 422 to allow a user to engage the drive shaft 412 with the electric drive unit assembly 500 and the battery-powered electric drive unit 510, such as a high-impact torque wrench or similar device to rotate the drive shaft 412. The battery-powered electric drive unit 510 may include a rechargeable battery pack 512. The drive element 422 may have a hexagonal shape to be engaged by a standard hexagonal high impact socket 514 on the electric drive unit assembly 500. The standard hexagonal socket 514 may be 0.5 inches or larger. A battery-powered electric drive unit 510 or similar drill-type apparatus or an air hammer attached to a pneumatic supply could be utilized as the rotating tool, thereby engaging the drive shaft 412 and rotating the drive shaft 412 to move the drive shaft 412, the lift tube assembly 450, and the lift toe 460 up and down. The electric drive unit assembly 500 may also allow the battery-powered electric drive unit 510 to be easily removed by a user and removed for storage.

As illustrated in FIG. 9, the electric drive unit assembly 500 may include a drill face plate 520 to hold the battery-powered electric drive unit 510. The drill face plate 520 may be connected to a handle plate 522 extending perpendicular to the drill face plate 520. A handle 524 may extend perpendicular and be connected to the handle plate 522. A handle grip 526 may surround the handle 524 and may be made of a foam material. One or more fastening straps 528 and one or more side plates 530 may be utilized to connect the electric drive unit assembly 500 to the housing assembly 300 and specifically to the upper housing assembly 310. The one or more fastening straps 528 may be designed to be quick-connect straps to quickly disconnect the battery-powered electric drive unit 510 from the housing assembly 300 and upper housing assembly 310 of the rail lifting device 100. The one or more side plates 530 may extend from and connect to the drill face plate 520. The one or more straps 528 may surround and secure the battery-powered electric drive unit 510 to the drill face plate 520, thereby securing the electric drive unit assembly 500 to the housing assembly 300. Additionally, the battery-powered electric drive unit 510 may be attached to an impact socket 514 which then connects to the drive element 422 of the drive shaft 412. The battery-powered electric drive unit 510 may be a battery-operated drill-type tool or other similar tools, such as electronic, pneumatic, or other such drill-type tools that will perform similar functionality as a battery-powered electric drive unit 510.

The various components for the rail lifting device 100, such as one or more of the lift jack assembly 200, the housing assembly 300, the vertical displacement jack assembly 400, and the electric drive unit assembly 500 may be made of a metallic material, preferably a steel alloy. Alternatively, the components may be made of other metallic materials such as iron, aluminum, an aluminum alloy, titanium, or a titanium alloy.

In one aspect, the present invention is distinguished by a unique modification of a conventional railroad spike puller design to create a dedicated rail lifting device 100. Traditional spike pullers are generally constructed with a fully enclosed housing and a gripping claw mechanism designed to extract railroad spikes. In the present invention, this configuration is altered by opening one side of the housing to form a lateral admission opening sized to accept the flange of a running rail. At the same time, the spike-gripping claw assembly is removed, thereby eliminating components unnecessary for spike extraction and creating internal space for a new lifting interface.

Within the modified housing, an L-shaped lifting structure, i.e. the lift tube assembly 450 and the vertical displacement jack assembly 400, as described and detailed may be installed in place of the removed claw. This lifting structure may be specifically configured to slide beneath a running rail from a ground-zero position through the lateral opening, thereby initiating lift without requiring manual bending or prying by the operator. The L-shaped lifting structure of the present invention is driven vertically by an threaded screw shaft coupled to a battery-powered electric drive. This arrangement translates rotary drive into linear displacement that elevates the rail vertically to a service height while maintaining lateral stability.

This modification fundamentally transforms the function of the spike puller or other similar tool: by reusing the robust two-piece housing and jack framework of the original tool, while converting the gripping and pulling functionality into vertical lifting and stabilizing functionality, the device operates as an ergonomic rail lifting jack. The ground-zero start position of the L-shaped lifting toe ensures that rail segments are raised directly from ballast level without manual pre-lifting, thereby reducing strain on operators and enhancing both safety and efficiency.

The rail lifting device 100 may have various advantages as explained above and listed below that may include one or more of the following:

The rail lifting device 100 may have an ergonomic design. The rail lifting device 100 may begin lifting from ground level, reducing manual lift and risk of back injuries. The rail lifting device 100 may include waist-level operation that minimizes torsion moment, enhancing user safety.

The rail lifting device 100 may include versatility, such that the device is suitable for various rail sizes in the railway industry, enhancing utility in maintenance tasks.

The rail lifting device 100 may include easy operation for use for the operator. The rail lifting device 100 may operate with a standard impact drill, no specialized tools required. The rail lifting device 100 may simplify lifting with a drill-powered mechanism over traditional systems.

The rail lifting device 100 may have enhanced safety and efficiency features. The rail lifting device 100 may decrease physical strain on the operator, improving workplace safety. The rail lifting device 100 may also increase stability and load capacity, promoting reliable maintenance operations.

The rail lifting device 100 may have adaptability, such that the device may include an integrated torque tube and threaded rod for quick adjustments and setup.

The rail lifting device 100 may include durability and maintenance features, such that the device is built with durable materials to withstand railway conditions, reducing maintenance needs.

The rail lifting device 100 may include cost-effectiveness features. The rail lifting device 100 may have a lower initial cost due to use of common tools and a simple design which may potentially reduce maintenance costs.

The rail lifting device 100 may provide and environmental impact, such that the battery operation reduces reliance on external power, lowering energy use.

The rail lifting device 100 may provide simple and easy user training, such that the device is a familiar tool use means less training time for operators.

The rail lifting device 100 may be portable and battery powered with a strong brushless motor. The rail lifting device 100 may include a rechargeable battery system, with no power cords or generators needed. The rail lifting device 100 may include a brushless motor for reliable, efficient, and long-lasting performance.

The rail lifting device 100 may include a handle-incorporated drive unit receiving assembly. The drive unit receiving assembly may protect the motor and provide an ergonomic handle for reduced strain.

The rail lifting device 100 may include lightweight design, making the device easier to maneuver, reducing operator fatigue, and ideal for mobile rail tasks.

The rail lifting device 100 may include an anti-vibration handle that reduces hand-arm vibration, improves comfort, balance, and grinding accuracy.

The rail lifting device 100 may include a reinforced shaft that increases durability to withstand railway maintenance tasks, extending the lifespan of the device.

The rail lifting device 100 may include dual functionality allowing for both lifting and stabilizing rail segments, making the device versatile for multiple applications, streamlining maintenance and reducing tool needs.

The present disclosure is disclosed above and in the accompanying drawings with reference to a variety of examples. The purpose served by the disclosure, however, is to provide examples of the various features and concepts related to the disclosure, not to limit the scope of the invention. One skilled in the relevant art will recognize that numerous variations and modifications may be made to the examples described above without departing from the scope of the present disclosure.

We claim:

1. A rail lifting device for lifting and stabilizing a railway running rail, the rail lifting device comprising:

a housing assembly including an upper housing and a lower housing joined together to define an internal cavity, the lower housing including a foot plate configured to rest on the ground and initiate lifting from ground level;

a vertical displacement jack assembly disposed within the housing assembly, the vertical displacement jack assembly including a screw shaft assembly with a threaded drive shaft;

a lift tube assembly coupled to the screw shaft assembly, the lift tube assembly comprising an upper torque tube, a lower torque tube, and a lift toe welded to the lower torque tube, the lift toe configured to slide beneath the running rail at ground level and extend vertically to elevate and stabilize a rail segment to a predetermined height; and, wherein the upper torque tube and the lower torque tube are guided and fit within the housing assembly by an upper tube guide block and a lower tube guide block; and an electric drive unit assembly operatively coupled to the screw shaft assembly.

2. The rail lifting device of claim 1, wherein the electric drive unit assembly comprises a detachable, off-the-shelf battery-operated impact drill.

3. The rail lifting device of claim 1, wherein the electric drive unit assembly comprises an integrated electric motor and gearbox powered by a rechargeable battery system.

4. The rail lifting device of claim 1, wherein the device is configured for waist-level operation to minimize torsional moment on an operator and reduce a risk of back injury, and wherein the device operates without hydraulic or ratchet systems.

5. The rail lifting device of claim 1, wherein the housing assembly comprises:

the lower housing including buttress plates between the lower housing and the foot plate for structural reinforcement; and an impact plate offset on a rear side of the lower housing for driving the foot plate beneath the rail.

6. The rail lifting device of claim 1, wherein the upper housing includes a handle attached to a sidewall for ergonomic maneuvering.

7. The rail lifting device of claim 1, wherein the screw shaft assembly includes a drive shaft having an Acme threaded region, a smooth region, and a reduced diameter region, the drive shaft coupled to the lift tube assembly via a mounting flange.

8. The rail lifting device of claim 1, wherein the vertical displacement jack assembly further includes a bearing block mounted within the upper housing, the bearing block containing one or more roller bearings to support free rotation of the drive shaft.

9. The rail lifting device of claim 8, wherein the one or more roller bearings includes an upper tapered roller bearing and a lower tapered roller bearing.

10. The rail lifting device of claim 1, further comprising grease fittings located on the housing assembly to provide lubrication to the screw shaft assembly.

11. The rail lifting device of claim 1, wherein the housing assembly includes measurement markings on the lower housing to indicate range of vertical displacement of the lift toe.

12. A rail lifting device for lifting and stabilizing a railway running rail, the rail lifting device comprising:

a housing assembly including an upper housing and a lower housing joined together to define an internal cavity, the lower housing including a foot plate configured to rest on the ground and initiate lifting from ground level;

a vertical displacement jack assembly disposed within the housing assembly, the vertical displacement jack assembly including a screw shaft assembly with a threaded drive shaft;

a lift tube assembly coupled to the screw shaft assembly, the lift tube assembly including a lift toe configured to slide beneath the running rail at ground level and extend vertically to elevate and stabilize a rail segment to a predetermined height; and an electric drive unit assembly operatively coupled to the screw shaft assembly, the electric drive unit assembly including a drill face plate, a handle plate, and quick-connect fastening straps configured to secure and detach the electric drive unit assembly.

* * * * *